(12) United States Patent
Liu et al.

(10) Patent No.: US 11,943,350 B2
(45) Date of Patent: Mar. 26, 2024

(54) SYSTEMS AND METHODS FOR RE-USING COLD STORAGE KEYS

(71) Applicant: Coinbase, Inc., San Francisco, CA (US)

(72) Inventors: Yolanda Liu, San Francisco, CA (US); Ryan Sears, San Francisco, CA (US); Alan Leung, San Francisco, CA (US); Zachary Blacher, San Francisco, CA (US); Jeremy Suurkivi, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 444 days.

(21) Appl. No.: 17/072,395

(22) Filed: Oct. 16, 2020

(65) Prior Publication Data
US 2021/0119781 A1    Apr. 22, 2021

Related U.S. Application Data

(60) Provisional application No. 62/945,635, filed on Dec. 9, 2019, provisional application No. 62/916,076, filed on Oct. 16, 2019.

(51) Int. Cl.
| | |
|---|---|
| *H04L 29/06* | (2006.01) |
| *H04L 9/06* | (2006.01) |
| *H04L 9/08* | (2006.01) |

(52) U.S. Cl.
CPC ............ *H04L 9/088* (2013.01); *H04L 9/0631* (2013.01)

(58) Field of Classification Search
None
See application file for complete search history.

(56) References Cited

U.S. PATENT DOCUMENTS

| | | | | |
|---|---|---|---|---|
| 5,884,274 A | * | 3/1999 | Walker | G06Q 40/03 235/379 |
| 6,125,186 A | * | 9/2000 | Saito | H04L 63/068 380/27 |

(Continued)

FOREIGN PATENT DOCUMENTS

| | | |
|---|---|---|
| EP | 2634738 A1 | 9/2013 |
| JP | 2007109002 A | 4/2007 |

(Continued)

OTHER PUBLICATIONS

International Search Report and Written Opinion for application No. PCT/US20/055949, dated Jan. 15, 2021.

(Continued)

*Primary Examiner* — Shin-Hon (Eric) Chen
*Assistant Examiner* — Hassan A Hussein
(74) *Attorney, Agent, or Firm* — Perkins Coie LLP

(57) ABSTRACT

In certain embodiments, the use of re-usable cold storage keys to sign messages may be facilitated. In some embodiments, an offline computer system (operating within an offline computing environment) may obtain, from a removable computer-readable storage medium, signing key shards corresponding to a signing private key and a blockchain transaction to be signed, where the signing key shards satisfy a key shard threshold that is (i) a number of key shards required for reconstructing the signing private key and (ii) less than a number of key shards derived from the signing private key using a ceremony key. The offline computer system may form a ciphertext of the signing private key using the signing key shards and reconstruct the signing private key by decrypting the ciphertext using the ceremony key. The offline computer system may sign the blockchain transaction using the signing private key.

20 Claims, 12 Drawing Sheets

(56) References Cited

U.S. PATENT DOCUMENTS

| Patent/Publication No. | Date | Inventor | Classification |
|---|---|---|---|
| 6,952,683 B1* | 10/2005 | Gerhard | G06Q 40/04 705/37 |
| 6,959,394 B1* | 10/2005 | Brickell | G06Q 20/3829 726/19 |
| 7,644,037 B1* | 1/2010 | Ostrovsky | G06Q 30/06 705/40 |
| 7,689,500 B2 | 3/2010 | Cottrell | |
| 7,689,550 B2 | 3/2010 | Lee et al. | |
| 7,970,823 B2* | 6/2011 | Moeller | G06F 9/542 709/224 |
| 8,055,575 B2 | 11/2011 | Grody et al. | |
| 8,111,648 B2* | 2/2012 | Gandham | H04L 1/0083 370/336 |
| 8,117,648 B2 | 2/2012 | Slaton et al. | |
| 8,606,703 B1* | 12/2013 | Dorsey | G06Q 10/107 705/40 |
| 8,839,386 B2 | 9/2014 | Gilboy | |
| 8,855,318 B1* | 10/2014 | Patnala | H04L 9/0866 380/279 |
| 9,071,429 B1* | 6/2015 | Roth | H04L 9/0894 |
| 9,135,787 B1* | 9/2015 | Russell | G07F 19/201 |
| 9,224,262 B2 | 12/2015 | Fine et al. | |
| 9,432,188 B2* | 8/2016 | Chida | G06F 21/606 |
| 9,495,668 B1* | 11/2016 | Juels | H04L 9/50 |
| 9,667,416 B1* | 5/2017 | Machani | H04L 9/3215 |
| 9,892,460 B1* | 2/2018 | Winklevoss | G06Q 40/04 |
| 9,910,997 B1* | 3/2018 | Brail | G06F 21/44 |
| 10,068,228 B1* | 9/2018 | Winklevoss | G06Q 20/34 |
| 10,180,912 B1* | 1/2019 | Franklin | G06F 21/6245 |
| 10,256,983 B1* | 4/2019 | Bauer | H04L 9/0861 |
| 10,269,009 B1* | 4/2019 | Winklevoss | G06Q 20/105 |
| 10,332,205 B1* | 6/2019 | Russell | G06Q 40/04 |
| 10,354,325 B1* | 7/2019 | Skala | G06Q 20/065 |
| 10,469,309 B1* | 11/2019 | Gupta | H04L 41/0609 |
| 10,586,057 B2* | 3/2020 | Keselman | G06F 21/6227 |
| 10,733,291 B1* | 8/2020 | McLeod | G06F 11/3058 |
| 10,764,752 B1* | 9/2020 | Avetisov | H04L 63/062 |
| 11,139,955 B1* | 10/2021 | So | G06Q 20/3674 |
| 11,200,569 B1* | 12/2021 | James | G06Q 20/381 |
| 11,238,164 B2* | 2/2022 | Ricotta | H04L 9/065 |
| 11,303,443 B2* | 4/2022 | Kuai | H04L 9/085 |
| 2001/0034605 A1* | 10/2001 | Hoffman | G06Q 30/0601 705/26.1 |
| 2001/0050990 A1* | 12/2001 | Sudia | G06Q 20/02 380/278 |
| 2002/0023053 A1* | 2/2002 | Szoc | G06Q 20/10 705/39 |
| 2002/0116611 A1* | 8/2002 | Zhou | H04L 9/3263 713/176 |
| 2003/0048906 A1* | 3/2003 | Vora | H04L 9/085 380/277 |
| 2005/0010760 A1* | 1/2005 | Goh | G16H 10/60 713/161 |
| 2005/0138374 A1* | 6/2005 | Zheng | H04L 9/0894 713/166 |
| 2006/0168663 A1* | 7/2006 | Viljoen | G06Q 20/4014 726/27 |
| 2007/0223706 A1* | 9/2007 | Gantman | G06F 21/602 380/286 |
| 2008/0091586 A1* | 4/2008 | Cottrell | G06Q 40/00 705/37 |
| 2008/0263363 A1* | 10/2008 | Jueneman | H04L 9/0877 713/184 |
| 2009/0037405 A1* | 2/2009 | Lee | G06F 16/2453 707/999.005 |
| 2009/0144810 A1* | 6/2009 | Gilboy | G06F 16/951 726/5 |
| 2009/0205036 A1* | 8/2009 | Slaton | H04L 63/08 726/26 |
| 2009/0254750 A1* | 10/2009 | Bono | H04L 63/065 380/282 |
| 2010/0054458 A1* | 3/2010 | Schneider | H04L 9/085 380/28 |
| 2010/0175061 A1* | 7/2010 | Maeda | G06F 8/65 717/173 |
| 2010/0235588 A1* | 9/2010 | Maeda | H04L 9/085 711/147 |
| 2011/0071958 A1* | 3/2011 | Grody | G06Q 40/06 705/36 R |
| 2011/0087582 A1* | 4/2011 | Pak | G06Q 40/04 705/37 |
| 2011/0106675 A1* | 5/2011 | Perlman | G06Q 20/405 715/764 |
| 2011/0202755 A1* | 8/2011 | Orsini | H04L 9/0816 713/151 |
| 2011/0251941 A1* | 10/2011 | Dunwoody | G06Q 40/04 705/37 |
| 2012/0136782 A1* | 5/2012 | Norman | G06Q 40/00 705/40 |
| 2012/0150750 A1* | 6/2012 | Law | H04L 67/02 705/76 |
| 2012/0239556 A1* | 9/2012 | Magruder | G06Q 30/06 705/39 |
| 2013/0010966 A1* | 1/2013 | Li | H04L 9/085 380/278 |
| 2013/0065670 A1* | 3/2013 | Michaelson | G06Q 20/0655 463/25 |
| 2013/0166455 A1* | 6/2013 | Feigelson | H04L 9/3234 705/64 |
| 2013/0191632 A1* | 7/2013 | Spector | H04L 9/085 713/155 |
| 2013/0246261 A1* | 9/2013 | Purves | G06Q 20/36 705/41 |
| 2013/0290710 A1* | 10/2013 | Broder | G06Q 30/04 713/168 |
| 2013/0318351 A1* | 11/2013 | Hirano | H04L 9/3231 713/168 |
| 2013/0339738 A1* | 12/2013 | Shaw | H04L 63/0428 713/171 |
| 2013/0343546 A1* | 12/2013 | Shibutani | H04L 9/002 380/286 |
| 2014/0019352 A1* | 1/2014 | Shrivastava | G06Q 20/326 705/41 |
| 2014/0025473 A1* | 1/2014 | Cohen | G06Q 30/0207 705/14.28 |
| 2014/0052617 A1* | 2/2014 | Chawla | G06Q 20/102 705/39 |
| 2014/0057599 A1* | 2/2014 | Hazari | H04W 12/062 455/411 |
| 2014/0082749 A1* | 3/2014 | Holland | G06F 21/60 726/29 |
| 2014/0108223 A1* | 4/2014 | Xiao | G06Q 10/10 705/37 |
| 2014/0156512 A1* | 6/2014 | Rahman | G06Q 20/326 705/39 |
| 2014/0172633 A1* | 6/2014 | Dogin | G06Q 50/01 705/26.8 |
| 2014/0229736 A1* | 8/2014 | Asim | H04L 9/0847 713/171 |
| 2014/0229739 A1* | 8/2014 | Roth | G06F 21/6218 713/189 |
| 2014/0274327 A1* | 9/2014 | Fine | G07F 17/3209 463/25 |
| 2014/0279436 A1* | 9/2014 | Dorsey | G06Q 20/10 705/39 |
| 2014/0289118 A1* | 9/2014 | Kassemi | G06Q 20/388 705/44 |
| 2014/0297537 A1* | 10/2014 | Kassemi | G06Q 20/3674 705/67 |
| 2014/0304171 A1* | 10/2014 | Mertens | G06Q 20/384 705/27.1 |
| 2015/0033301 A1* | 1/2015 | Pianese | H04L 67/1097 726/5 |
| 2015/0039444 A1* | 2/2015 | Hardin | H04L 41/06 705/14.69 |
| 2015/0050987 A1* | 2/2015 | Huang | G06Q 20/384 463/25 |
| 2015/0120569 A1* | 4/2015 | Belshe | G06Q 20/3829 705/71 |

(56) References Cited

U.S. PATENT DOCUMENTS

| | | | | |
|---|---|---|---|---|
| 2015/0127495 | A1* | 5/2015 | Houri | G06Q 30/0635 705/26.81 |
| 2015/0170112 | A1* | 6/2015 | DeCastro | G06Q 20/367 705/39 |
| 2015/0178693 | A1* | 6/2015 | Solis | G06Q 20/385 705/40 |
| 2015/0209678 | A1* | 7/2015 | Edwards | A63F 13/792 463/25 |
| 2015/0220928 | A1* | 8/2015 | Allen | G06Q 20/10 705/67 |
| 2015/0227897 | A1* | 8/2015 | Loera | G06Q 20/0855 347/5 |
| 2015/0228004 | A1* | 8/2015 | Bednarek | G06Q 30/0633 705/26.8 |
| 2015/0262137 | A1 | 9/2015 | Armstrong | |
| 2015/0262139 | A1 | 9/2015 | Shtylman | |
| 2015/0262171 | A1* | 9/2015 | Langschaedel | H04L 51/08 705/71 |
| 2015/0262173 | A1* | 9/2015 | Durbin | G06Q 20/381 705/64 |
| 2015/0262176 | A1* | 9/2015 | Langschaedel | G06Q 20/3678 705/44 |
| 2015/0287026 | A1* | 10/2015 | Yang | G06Q 20/065 705/69 |
| 2015/0294308 | A1* | 10/2015 | Pauker | G06Q 20/02 705/67 |
| 2015/0302401 | A1* | 10/2015 | Metral | G06Q 20/06 705/71 |
| 2015/0310424 | A1* | 10/2015 | Myers | G06Q 20/401 705/69 |
| 2015/0332256 | A1* | 11/2015 | Minor | H04L 9/50 705/69 |
| 2015/0365283 | A1* | 12/2015 | Ronca | G06Q 20/065 705/71 |
| 2016/0034896 | A1* | 2/2016 | O'Brien | G06Q 20/227 705/37 |
| 2016/0085955 | A1* | 3/2016 | Lerner | H04L 9/0869 726/20 |
| 2016/0086418 | A1* | 3/2016 | Smolen | G07F 9/001 700/232 |
| 2016/0171570 | A1* | 6/2016 | Dogin | G06Q 30/0633 705/26.2 |
| 2016/0191250 | A1* | 6/2016 | Bestler | G06F 16/2255 713/168 |
| 2016/0203572 | A1* | 7/2016 | McConaghy | G06F 21/16 705/58 |
| 2016/0261411 | A1* | 9/2016 | Yau | G06Q 20/38215 |
| 2016/0277398 | A1* | 9/2016 | Gregg | G06F 21/44 |
| 2016/0321654 | A1* | 11/2016 | Lesavich | H04L 67/104 |
| 2016/0337124 | A1* | 11/2016 | Rozman | G06F 21/6209 |
| 2016/0344543 | A1* | 11/2016 | Alness | H04L 63/06 |
| 2016/0380767 | A1* | 12/2016 | Hayashi | H04L 9/14 380/45 |
| 2017/0063531 | A1* | 3/2017 | Sullivan | G06F 21/6209 |
| 2017/0083718 | A1* | 3/2017 | Peddada | G06F 21/6227 |
| 2017/0161439 | A1* | 6/2017 | Raduchel | G16H 10/60 |
| 2017/0250972 | A1* | 8/2017 | Ronda | H04L 63/0428 |
| 2018/0075453 | A1* | 3/2018 | Durvasula | G06Q 20/3678 |
| 2018/0191503 | A1* | 7/2018 | Alwar | H04L 9/3242 |
| 2018/0219671 | A1* | 8/2018 | Velissarios | G06F 9/54 |
| 2018/0248704 | A1* | 8/2018 | Coode | H04L 9/0825 |
| 2018/0367316 | A1* | 12/2018 | Cheng | G06F 21/72 |
| 2019/0034917 | A1* | 1/2019 | Nolan | H04L 9/0891 |
| 2019/0207754 | A1* | 7/2019 | Lyer | H04L 9/0877 |
| 2019/0236245 | A1* | 8/2019 | Desarzens | G06F 21/6209 |
| 2019/0238550 | A1* | 8/2019 | Zhang | H04L 63/105 |
| 2019/0280864 | A1* | 9/2019 | Cheng | H04L 9/3247 |
| 2019/0288840 | A1* | 9/2019 | Gallancy | H04L 9/0825 |
| 2019/0318356 | A1* | 10/2019 | Martin | H04L 9/0637 |
| 2020/0036707 | A1* | 1/2020 | Callahan | H04L 67/53 |
| 2020/0084027 | A1* | 3/2020 | Duchon | G06F 21/602 |
| 2020/0111080 | A1* | 4/2020 | Metcalfe | G06Q 20/3825 |
| 2020/0213107 | A1* | 7/2020 | Choi | H04L 63/0435 |
| 2020/0334674 | A1* | 10/2020 | Youngblood | H04L 9/50 |
| 2020/0351074 | A1* | 11/2020 | Wood | H04L 9/0861 |
| 2020/0394176 | A1* | 12/2020 | Wu | G06F 16/9024 |
| 2020/0394220 | A1* | 12/2020 | Novotny | G06F 16/9024 |
| 2021/0027283 | A1* | 1/2021 | Gaddam | G06Q 20/3674 |
| 2021/0083872 | A1* | 3/2021 | Desmarais | G06F 21/74 |
| 2021/0097528 | A1* | 4/2021 | Wang | G06Q 20/3825 |
| 2021/0119781 | A1* | 4/2021 | Liu | H04L 9/3239 |
| 2021/0357514 | A1* | 11/2021 | Agarwal | G06F 21/62 |
| 2023/0074215 | A1* | 3/2023 | Cooter | A61B 1/00137 |

FOREIGN PATENT DOCUMENTS

| | | |
|---|---|---|
| WO | 0184906 A2 | 11/2001 |
| WO | 2014190323 A1 | 11/2014 |

OTHER PUBLICATIONS

Rothenberger, Benjamin, et al., "Internet Kill Switches Demystified", Proceedings fo the 10th European Workshop on Systems Security, Apr. 23, 2017.

"A plea to exchanges . . . lets do 2 factor right!" Bitcoin Forum, download from https://bitcointalk.org/index.php?topic=109424.0%E2%80%93%20Stephen%20Gomick%20NOV%205%20%2712%20at%2016:56 (posted Sep. 14, 2012), (10 pages).

"Bitcoin Explained Like You're Five Part 3-Cryptography", http://chrispacia.wordpress.com/2013/09/07/bitcoin-cryptography-digital-signatures-explained/,2013, (21 pages).

"Bitcoin Explained Like You're Five, Part 4-Securing Your Wallet", https://chrispacia.wordpress.com/2013/09/29/bitcoin-explained-like-youre-five-part-4-securing-your-wallet/, dated Sep. 29, 2013) (Year: 2013), (15 pages).

"BlockchainCreate", http://blockchain.info:80/wallet/faq, dated Jan. 9, 2012, (5 pages).

"How to sell Lindens" dated Mar. 6, 2013 (Year: 2013).

"Off-the-chain transactions", downloaded from http://gavintech.blogspot.com/2012/07/off-chain-transactions.html, dated Jul. 3, 2012 (Year: 2012), (4 pages).

"Securing your wallet", download from https://bitcoin.org/en/secure-yourwallet (post from 2013), (4 pages).

"Send bitcoins to an unknown recipient", Feb. 13, 2011, downloaded from https://bitcointalk.org/index.php?topic=3427.0, (Year: 2011).

"Send Bitcoins to Email Addresses!", Jan. 9, 2012, downloaded from https://web.archive.org/web/20120109084110/http://www.bitcoinmail.com/, merged and attached as PDF file, (Year: 2012).

"Transaction Fees ("Transaction fees and negative balances"", downloaded from https://bitcointalk.org/index.php?topic=6856.0 dated Apr. 30, 2011-May 1, 2011, (Year:2011), (3 pages).

"Wholesale Payment Systems: Interbank Payment and Messaging System, Fedwire and Clearing House Interbank Payment Systems (CHIPS)", https://www.ffiec.gov/ffiecinfobase/booklets/Wholesale/02.html, Dec. 16, 2005, 3 pages).

"You Can Now Send Bitcoins over Email with Tip Bot", Feb. 26, 2014, downloaded from https://www.coindesk.com/can-now-send-bitcoins-email-tip-bot, (Year: 2014).

Beal, Alex, "Backing Up Sensitive Data With Secret Sharing", downloaded from https:www.usrsb.in/secret-sharing-backup.html, dated Feb. 23, 2013) (Year: 2013), (8 pages).

Computer Arch (http://www.math.uaa.alaska.edu/~afkjm/cs101 /handouts/ComputerArch.pdf attached as pdf, dated Sep. 10, 2009).

Dion, Derek A., "I'll gladly trade you two bits on Tuesday for a byte today: Bitcoin, regulating fraud in the e-conomy of Hacker-cash", Journal of Law, Technology & Policy, vol. 2013, 2013, pp. 165-201.

Doguet, Joshua J., "The Nature of the Form: Legal and Regulatory issues surrounding the Bitcoin digital currency system", Louisiana Law Review, vol. 73, No. 1, Summer 2013, pp. 1118-1153.

International Search Report and Written Opinion for PCT Application No. PCT/US2019/027857 dated Jul. 15, 2019.

Meiklejohn, Sarah et al., "A fistful of bitcoins: Characterizing Payments among men with no names", 2013, (8 pages).

NIST (Archived NIST Technical Series Publication, dated Jul. 2012, "sp800-57_part1_rev3_general.pdf", attached as pdf.).

(56) References Cited

OTHER PUBLICATIONS

Wallace, Benjamin, "The rise and fall of bitcoin", Magazine, Wired, https://www.wired.com/2011/11/mf_bitcoin/all/1., Nov. 23, 2011, pp. 1-17.
"Blockchain ("How do off chain transactions work?" downloaded from https://bitcoin.stackexchange.com/questions/123530/how-do-off-chain-transactions-work, year 2013."
"Coin Selection Algorithm—What is the coin selection algorithm", downloaded from https://web.archive.org/web/20130228073524/https://bitcoin.stackexchange.com/questions/1077/what-is-the-coin-selection-algorithm dated Feb. 27, 2014.
"GitHub for SelectCoin code", https://github.com/trottier/original-bitcoin/blob/master/src/main.cpp, lines 2410-2510, dated Apr. 4, 2013.
"How Bitcoin Works, downloaded from https://www.forbes.com/sites/investopedia/2013/08/01/how-bitcoin-works/#284bd94a17ff, dated Aug. 1, 2013, attached as PDF file. (Year: 2013)".
"Inputs.io FAQ", https://inputs.io/faq, 2013.
International Search Report and Written Opinion of the ISA dated Dec. 18, 2019 for PCT/US19/52371.
Meiklejohn Sarah; et al., "A fistful of bitcoins: Characterizing Payments among men with no names", 2013, (8 pages), Oct. 20, 2017 00:00:00.0.
"Multi-Party Threshold Signature Scheme", https://github.com/binance-chain/tss-lib#readme.
"NPL4, Importing Bitcoin from a paper wallet into Electrum", https://thecleverest.com/, dated Mar. 12, 2014.
"Proactive secret sharing", Wikipedia, https://en.wikipedia.org/wiki/Proactive_secret_sharing.
"Strongcoin—The safest Bitcoin e-wallet on the planet", https://www.javaworld.com/article/2078467/bitcoin-for-beginners-part-2--bitcoin-as-a-technology-and-network.html, year 2013.
Antonopoulos, Andreas M., "Mastering Bitcoin Unlocking Digital Crypto-Currencies", 2014.
Bernstein, Daniel J., "Curve25519: new Differentiations-Hellman speed records", 9th International Conference on Practice and Theory in Public-Key Cryptography, New York NY, USA, Apr. 24-26, 2006, Proceedings pp. 207-228, (Lecture Notes in Computer Science; vol. 3958), https://cr.yp.to/ecdh/curve25519-20060209.pdf.
Berstein, Daniel J., et al., "High-speed high-security signatures", Journal of Cryptographic Engineering vol. 2, pp. 77-89(2012), Published: Aug. 14, 2012.
Bradbury, Danny, "BitGo Safe Aims to Secure Bitcoin Wallets with Multi-Signature Transactions", CoinDesk, The Voice of Digital Currency, http://web.archive.org/web/20140108021304/http://www.coindesk.com/, published Dec. 19, 2013.
Breitner, Joachim, et al., "Biased Nonce Sense: Lattice Attacks against Weak ECDSA Signatures in Cryptocurrencies", Financial Cryptography and Data Security, pp. 3-20, DOI: 10.1007/978-3-030-32101-7_1, Sep. 2019.
Davis, Don, "Defective Sign & Encrypt in S/MIME, PKCS#7, MOSS, PEM, PGP, and XML", The Proceedings of the 2001 UNSENIX Annual Technical Conference, Jun. 25-30, 2001, Boston, Massachusetts, USA, pp. 65-78 of the Proceedings.
Gennaro, Rosario, et al., "Revisiting the Distributed Key Generation for Discrete-Log Based Cryptosystems", https://pdfs.semanticscholar.org/642b/d1bbc86c7750cef9fa770e9e4ba86bd49eb9.pdf, 2003.
Krawczyk, H., et al., "HMAC-based Extract-and-Expand Key Derivation Function (HKDF)", Internet Engineering Task Force (IETF), May 2010, https://tools.ietf.org/html/rfc5869.
Lee, Leland, et al., "Alternative Signatures Schemes", Medium, Feb. 12, 2019, https://medium.com/blockchain-at-berkeley/alternative-signatures-schemes-14a563d9d562.
Marlinspike, Moxie, et al., "The X3DH Key Agreement Protocol", Signal, Revision 1, Nov. 4, 2016.
Merkel, Dirk, "Bitcoin for beginners, Part 2: Bitcoin as a technology and network", Javaworld, Dec. 6, 2011.
Neuman, Nick, "KeySplit-Tackling the hard parts of being your own bank", https://medium.com/@nickneuman/keysplit-private-key-security-for-cryptocurrency-owners-d1653ea9631d, Feb. 24, 2018.
Ouaddah, Aafaf, et al., "FairAccess: a new Blockchain-based access control framework for the 1-20 Internet of Things", In: Security and Communication Networks, Feb. 19, 2017.
Pedersen, Torben Pryds, "Non-Interactive and Information-Theoretic Secure Verifiable Secret Sharing", Advances in Cryptology, CRYPTO '91, LNCS 576, pp. 129-140, 1992.
Shamir, Adi, "How to Share a Secret", Communications of the ACM, Nov. 1979, vol. 22, No. 11.
Stinson, Douglas, et al., "Provably Secure Distributed Schnorr Signatures and a (t, n) Threshold Scheme for Implicit Certificates", Australasian Conference on Information Security and Privacy ACISP 2001: Information Security and Privacy pp. 417-434.
Tibouchi, Mehdi, "Attacks on Schnorr signatures with biased nonces", NTT Secure Platform Laboratories, ECC Workshop, Nov. 13, 2017.

* cited by examiner

US 11,943,350 B2

SYSTEMS AND METHODS FOR RE-USING COLD STORAGE KEYS

CROSS-REFERENCE TO RELATED APPLICATIONS

This application claims priority to U.S. Provisional Application No. 62/916,076, filed 16 Oct. 2019, and U.S. Provisional Application No. 62/945,635, filed 9 Dec. 2019, which are each incorporated herein in its entirety by this reference.

TECHNICAL FIELD

This invention relates generally to the cryptocurrency field, and more specifically to a new and useful system and method for re-using cold storage keys.

BACKGROUND

Private keys used to sign cryptocurrency transactions are sometimes generated off-line and managed by a cold-storage system. Once a private key managed by a cold storage system is moved on-line (e.g., to sign a cryptocurrency transaction), its security is assumed to be compromised.

There is a need in the computer networking field to create a new and useful systems and methods for managing private keys. This disclosure provides such new and useful systems and methods.

DESCRIPTION OF THE PREFERRED EMBODIMENTS

Figure 1:
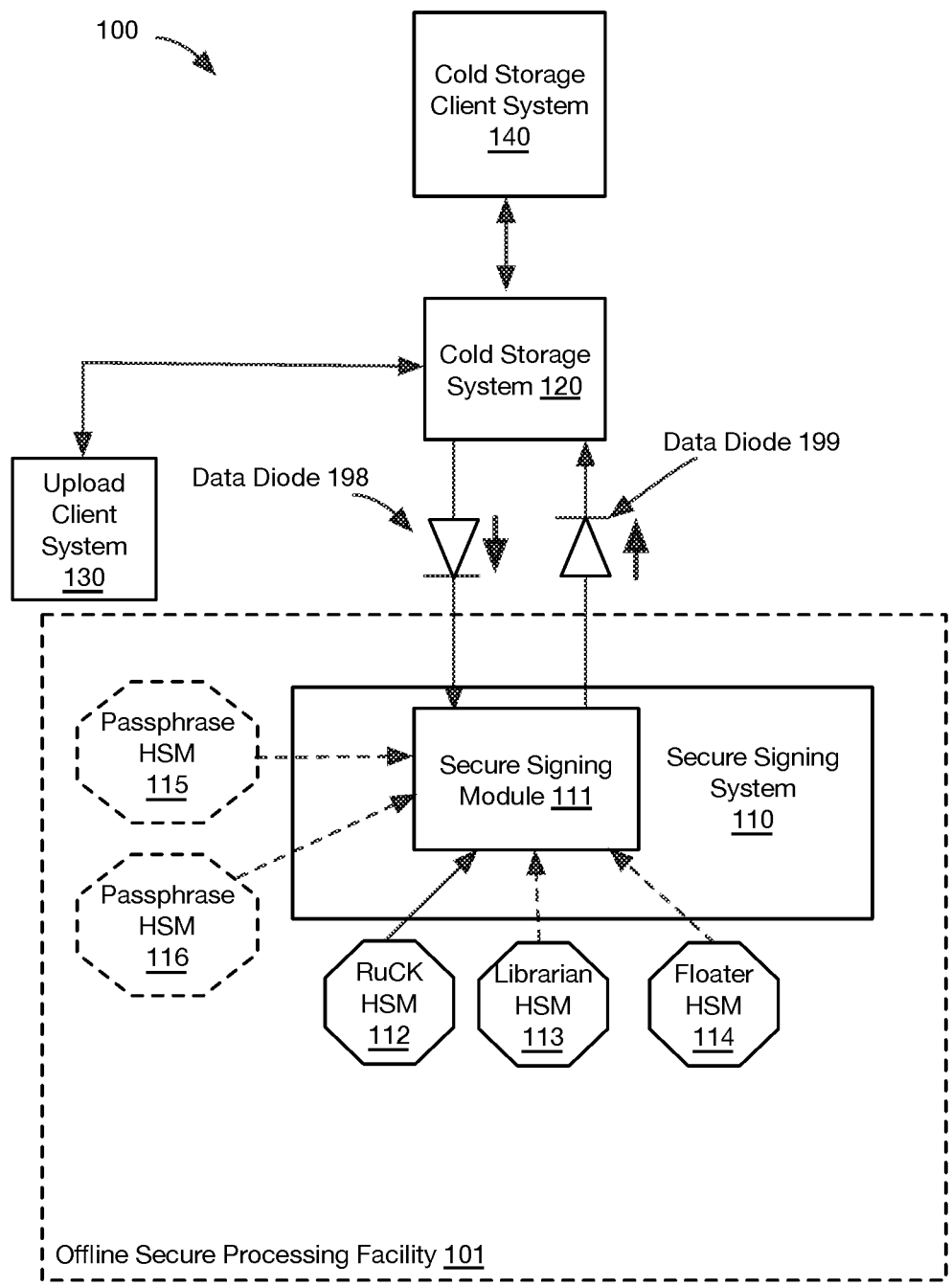
FIG. 1 is a schematic representation of system, in accordance with variations.

The following description of embodiments is not intended to limit the claims to these embodiments, but rather to enable any person skilled in the art to make and use embodiments described herein.

1. Overview.

Signing of transactions for operations related to management of a cryptocurrency protocol often require access to a private key. However, accessing and using such a private key for transaction signing can increase risk of the private key being accessed by an unauthorized entity. Variations of the invention disclosed herein relate to signing of transactions such that a private key never exists in the clear outside of key generation.

In some variations, a private key is generated offline (e.g., during a key generation ceremony at an offline secure processing facility). During this key ceremony, the private key is encrypted by using a ceremony key (e.g., symmetric key or public key; using AES encryption; "a key"; etc.) to generate ciphertext ($\alpha$-ciphertext), the ciphertext is sharded into n shards (e.g., using Shamir's Secret Sharing) such that a threshold number of shards t of the total number of shards n can reconstruct the ciphertext (e.g., by performing a Shamir's Secret Sharing process). Each shard ($\alpha$-shard) is then encrypted to an account manager (e.g., a sage, a participant) by using a key ($\beta$-key) of the respective account manager (e.g., a public key of an asymmetric key pair). Shards encrypted to an account manager by using a respective $\beta$-key are referred to as $\beta$-shards in this disclosure. During this key ceremony, the ceremony key (e.g., the symmetric key, the private key paired with the public key, $\alpha$-key, etc.) used to generate the ciphertext is securely stored offline (e.g., at the offline secure processing facility 101, in a hardware security module (HSM) 112, etc.). In some variations, the ceremony key offline storage (e.g., CKOS) can be password-protected, wherein the CKOS password can be sharded into m shards (e.g., using Shamir's Secret Sharing) such that s of m shards can reconstruct the password to unlock the CKOS (e.g., RuCK HSM 112 shown in FIG. 1) for use in private key restoration. In some variations, the ceremony key can be used to restore the private key (generated during the key ceremony) offline, and the private key can be used to sign a message (e.g., a cryptocurrency transaction) offline. The signed message can be securely provided to an on-line system for further processing and/or transmission to another system (e.g., a blockchain node).

In some variations, a system (e.g., 100 includes a cold storage system (e.g., 120), and a secure signing system (e.g., no). The system (e.g., Dm) can also include one or more of an upload client system (e.g., 130) and a cold storage client system (e.g., 140).

In some variations, the method 200 includes at least one of: receiving a signing request (optionally referencing a message and/or a public key associated with a message signing private key to be used for message signing); receiving message signing key shards (e.g., $\alpha$-shards 819 shown in FIG. 8, $\beta$-shards 902 shown in FIG. 9) for a message signing private key S220; restoring the message signing private key by using the message signing key shards S230; and signing a message using the restored message signing private key S240. In variants, the method includes generating the message signing key shards (e.g., $\alpha$-shards, $\beta$-shards) for the message signing private key S210. In variants, the method includes providing the signed message S250.

In an example, all or parts of the method is performed by an offline secure signing module, and the method includes receiving a signing request that identifies a message to be signed, and at least a portion of a plurality of message signing key shards for a message signing private key. The message signing key shards and/or message can be received from a data diode or one or more hardware security modules (HSMs) coupled to the secure signing module. The offline secure signing module accesses a symmetric key from a Reusable Cold Key (RuCK) HSM (Hardware Security Module) coupled to the offline secure signing module. The signing module combines the received message signing key shards into an encrypted message signing private key, and decrypts the encrypted message signing private key by using the symmetric key. The signing module signs the message by using the decrypted message signing private key. The signed message can be provided via a second data diode.

The message signing key shards can be generated by: generating a message signing private key (S310), encrypting the message signing private key with the symmetric key, thereby generating ciphertext (S320), and splitting the ciphertext into message signing key shards (S330). The message signing key shards can be secured (e.g., encrypted, protected by a password, or otherwise secured) (S340).

In an example implementation, the method includes at least one of: generating a message signing private key (S310 shown in FIG. 3); encrypting the message signing private key to generate ciphertext (e.g., S320); splitting the ciphertext into shards (e.g., S330); optionally securing the shards (e.g., S340) (e.g., by encrypting each shard to generate encrypted shards). A signing request (e.g., that identifies a message, and a public key for the message signing private key) can be received (e.g., S410 shown in FIG. 4) from a client. In response to identifying the private key for the signing request as part of a reusable cold key (RuCK) pair (e.g., at S420), α-shards (message signing key shards) are accessed (e.g., S430). The α-shards can be accessed by decrypting encrypted versions of the α-shards (e.g., by sending the encrypted α-shards to users, and receiving decrypted α-shards back, wherein the encrypted α-shards are decrypted using keys held by the users, such as within an HSM), and providing the α-shards and the message to a secure signing system. The secure signing system can be offline, air-gapped, security-hardened, have limited entry and exit points, and/or otherwise secured. The secure signing system can reassemble the message signing private key by using the α-shards, and use reassembled message signing private key to sign the message (e.g., generate a signed message). In variants, the α-shards are reassembled into an α-ciphertext, wherein the secure signing system can access an α-key (e.g., ceremony key) and decrypt the α-ciphertext to obtain the message signing private key. The secure signing system can access the α-key by unlocking password-protected storage (e.g., an HSM) storing the α-key (e.g., wherein the password can be reconstructed from shards). The secure signing system can provide the signed message to another system (e.g., the cold storage system 120 shown in FIG. 1). In variants, each data transfer between a sending and receiving system can be verified (e.g., by verifying the sender's private key signature; by verifying metadata sent with the data, such as a CKOS history log or a secure signing system history log; by verifying that the sender or recipient's IP address is on a whitelist; using out-of-band authentication, such as 2-factor authentication; etc.) before decryption with the receiver's private key (wherein the data can be encrypted to the receiver's public key by the sender). Data transferred between sending and receiving systems can optionally be encrypted (e.g., with a public key of the receiving system), signed (e.g., with a key of the sending system), be stored in an immutable or read-only format or medium (e.g., flashed data, DVDs, CDs,), and/or have other properties. Digital versions of the β-shards, α-ciphertext, message signing key, α-key, and/or other sensitive information can be deleted or erased immediately upon use (e.g., transmission, signing) or otherwise managed. All or portions of the method can be performed in volatile memory (e.g., RAM) or other memory.

In some implementations, at least one component of the system (e.g., 100) performs at least a portion of the method (e.g., 200).

In one example, the key generation and storage system and method that is used can be that described in U.S. application Ser. No. 16/386,786 filed 17 Apr. 2019, which is incorporated herein in its entirety by this reference. However, any other suitable key generation method and cold storage method can be used.

This system and method can be used in: custodying cryptocurrency (on behalf of another entity), proof of stake use cases (e.g., by the delegate or delegator), and/or any other suitable application.

2. Benefits.

The system and method disclosed herein can confer several benefits over conventional systems and methods.

First, signing can be securely performed off-line without exposing the private signing key to an on-line system. This can be further enabled by reconstructing the signing key (e.g. reconstructing the α-ciphertext) off-line. In some use cases, this can enable cold-stored private keys to be securely reused, without requiring new key assignment to the set of account managers and/or cryptocurrency transfer to a new address associated with the new key.

Second, access to the private signing key can be restricted by: limiting access to encrypted shares of the private key, and distributing keys, passphrases (needed to recover the private key), and/or shards thereof among a plurality of discrete hardware devices such that no single hardware device has access to all information needed to reconstruct the private signing key.

Third, logging of transaction signing operations can be performed to enable auditing and oversight of transaction signing operations.

Additional benefits can be provided by the systems and methods disclosed herein.

3. System.

FIG. 1 shows a system. The system 100 includes at least one of a cold storage system 120, and a secure signing system 110. In some variations, the system includes one or more of an upload client system 130 and a cold storage client system 140. In some implementations, the secure signing system no and the upload client system 130 are included in an offline secure processing facility 101.

In some variations, the cold storage client system 140 functions to generate signing requests and provide the signing requests to the cold storage system 120. The signing requests can identify or include a message to be signed (unsigned message), and a public key to be used to authenticate the signed message. The message can be any suitable type of message, such as a blockchain transaction, a secure communication, and the like. In some variations, the cold storage client system 140 is implemented as one or more hardware devices (e.g., servers including at least one processor and at least one storage device that includes machine-executable instructions to be executed by the at least one processor). However, the cold storage client system 140 can be otherwise configured and/or perform any other suitable functionality.

In some variations, the cold storage system 120 functions to process a signing request received from a cold storage client system (e.g., 140 and use the secure signing system 110 to sign the message identified in the signing request. In variants, the cold storage system requests (and optionally stores) RuCK public keys (and/or hashes thereof) (e.g., received from a secure computing system), and uses the RuCK public keys (and/or hashes thereof) for cold storage of cryptocurrency assets (or any other suitable data).

In some variations, the cold storage system 120 is implemented as one or more hardware devices (e.g., servers including at least one processor and at least one storage device that includes machine-executable instructions to be executed by the at least one processor). However, the cold storage system 120 can be otherwise configured and/or perform any other suitable functionality.

In a first variant, the cold storage system 120 operates within an on-line computing environment (e.g., the cold storage system 120 is communicatively coupled to other devices via one or more private or public networks, which may or may not be secured). In an example, the cold storage system 120 is communicatively coupled to at least one other computing device via a network (e.g., the Internet, a private network, etc.). In a second variant, the cold storage system 120 operates within an off-line computing environment (e.g., the cold storage system 120 has no access or limited access to other devices via networks). In an example, the cold storage system 120 receives information from account managers via a user input device (e.g., keyboard, scanner, camera, microphone, etc.) or hardware bus of the cold storage system 120. In an example, the cold storage system 120 receives information generated by the cold storage client system 140 via a user input device (e.g., keyboard, scanner, camera, microphone, etc.) or hardware bus of the cold storage system 120. However, the cold storage system 120 can be configured to receive information from other components of the system 100 in any suitable manner.

In some variations, the upload client system 130 functions to securely transport to the cold storage system 120 private key information for a private key (e.g., the private key to be used to sign the message identified in the message request, message signing key). The upload client system 130 can receive the private key information from one or more of physical storage, cold storage, air gapped storage, an input device, an account manager computing system (sage), or any other suitable computing system or device. In some implementations, the private key information includes encrypted private key shards (e.g., β-shards) for a private key to be used for signing the message. In some implementations, the private key corresponds to a public key identified in the signing request received by the cold storage system 120. In some implementations, the private key information uploaded by the client system 130 (e.g., from physical storage, cold storage, airgapped storage, etc.) to the cold storage system 120 includes β-ciphertext for the private key (which is encrypted with a first set of one or more keys), and the cold storage system 120 orchestrates the decryption of the β-ciphertext into α-shards. In some variations, the upload client system 130 is implemented as one or more hardware devices (e.g., servers including at least one processor and at least one storage device that includes machine-executable instructions to be executed by the at least one processor). In some variations, the upload client system 130 is implemented as a secured laptop. In some variations, the upload client system includes a secured operating system that has restricted or limited functionality and optionally limited persistent storage functionality. However, the upload client system 130 can be otherwise configured and/or perform any other suitable functionality.

In some variations, the secure signing system 110 functions to sign a message received from the cold storage system 120 (e.g., via a data diode 198 shown in FIG. 1) by using private key information (e.g., message signing key shards, α-shards) provided by the cold storage system 120 and a ceremony key (encryption key, α-key). The ceremony key is preferably received from offline storage (e.g., the CKOS; etc.), but can additionally or alternatively be securely stored at the secure signing system 110, or otherwise stored or obtained. In some implementations, the private key information provided from the cold storage system 120 to the secure signing system 110 includes the α-shards. When the secure signing system 110 receives α-shards, the secure signing system can optionally reconstruct the α-ciphertext from the α-shards. Alternatively, the private key information provided from the cold storage system 120 to the secure signing system 110 includes the α-ciphertext (e.g., reconstructed from the α-shards by the cold storage system 120 by the cold storage system or other system). The α-ciphertext is then decrypted using the ceremony key (α-key, encryption key) securely loaded at the secure signing system 110 to obtain the message signing private key. The decrypted message signing private key is then used to sign the message (received from the cold storage system 120) by using the reconstructed message signing private key. After message signing, the decrypted message signing private key and/or the encryption key (α-key) can be discarded (e.g., deleted; lost when the secure signing system is depowered, wherein the signing is performed in volatile memory; etc.), or otherwise managed. In some variations, the secure signing system 110 functions to securely transport the signed message to the cold storage system 120 (e.g., via a data diode 199 shown in FIG. 1)

Communication between the secure signing system 110 and other systems, such as the cold storage system 120, is preferably via one or more data diode (e.g., hardware that functions as a unidirectional security gateway), but can additionally or alternatively be facilitated by: encrypted communications, secure physical connections (e.g., wired connections), physical courier, and/or any other suitable communications means. examples of data diodes that can be used include: compact disks (e.g., read-only, read and write CDs, etc.), DVDs, unidirectional optical fibers, RS-232 cabled with the transmit or receive pin removed (e.g., depending on whether the cable is a receive or transfer cable, respectively), ASICs, and/or any other suitable hardware.

In some implementations, the secure signing system 110 is implemented as a secured laptop. In some variations, the secure signing system 110 includes a secured operating system that has restricted or limited functionality and optionally limited persistent storage functionality.

Figure 8:
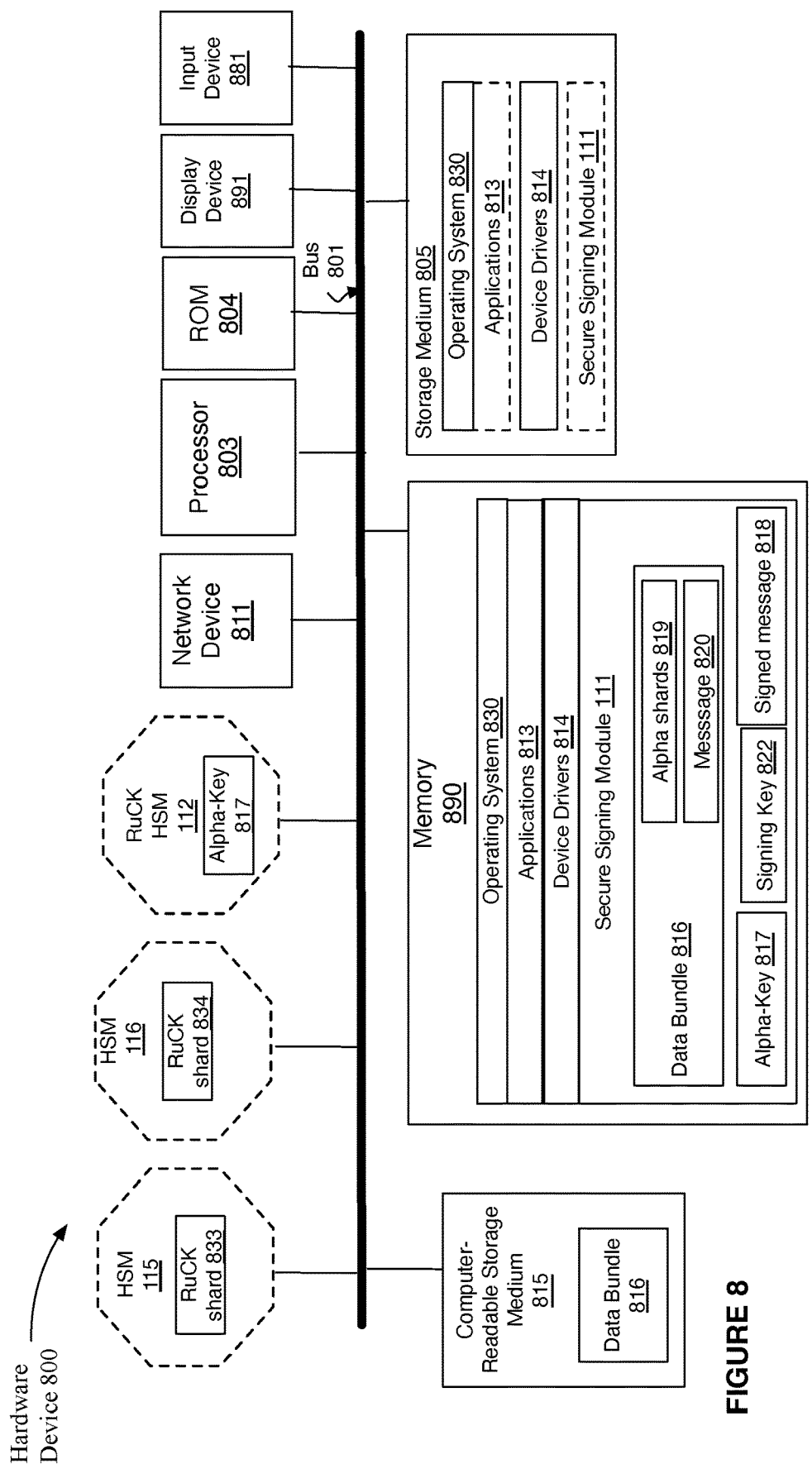
FIG. 8 is a representation of a hardware device, in accordance with variations.
Figure 9:
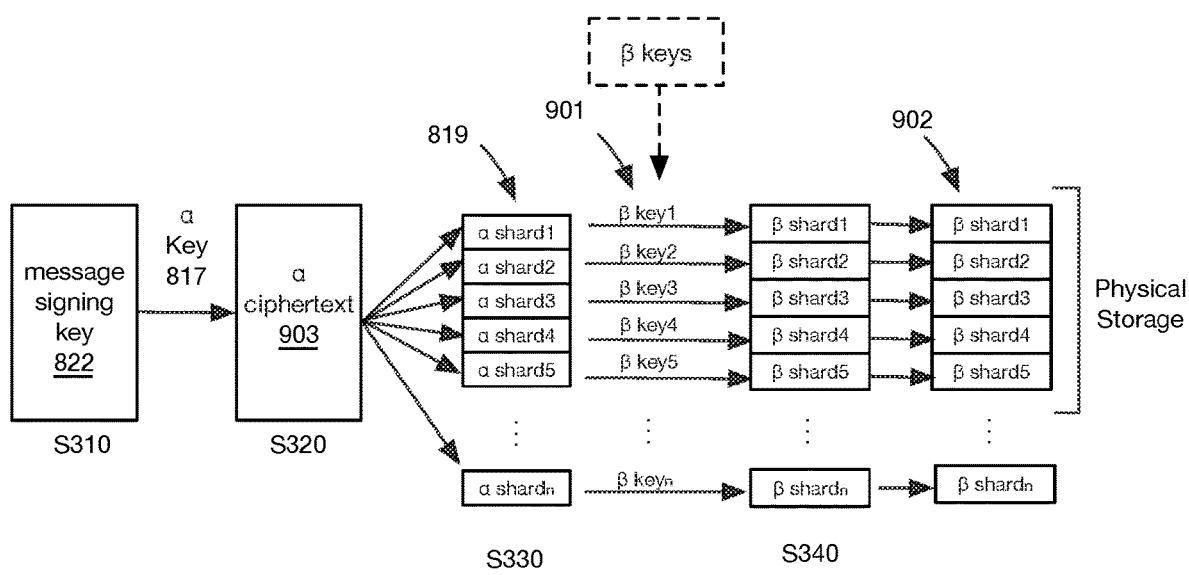
FIG. 9 is a representation of generating message signing key shards, in accordance with variations.
Figure 10A:
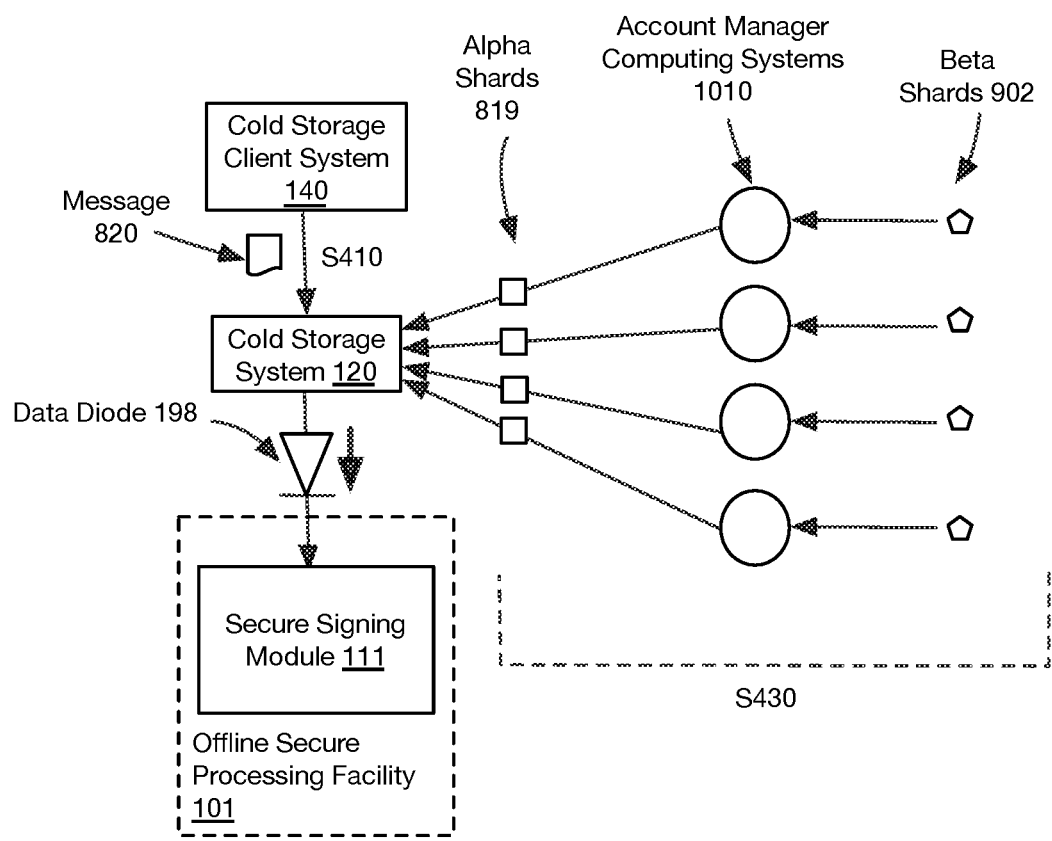
FIG. 10A is a representation of accessing alpha shards, in accordance with variations.
Figure 10B:
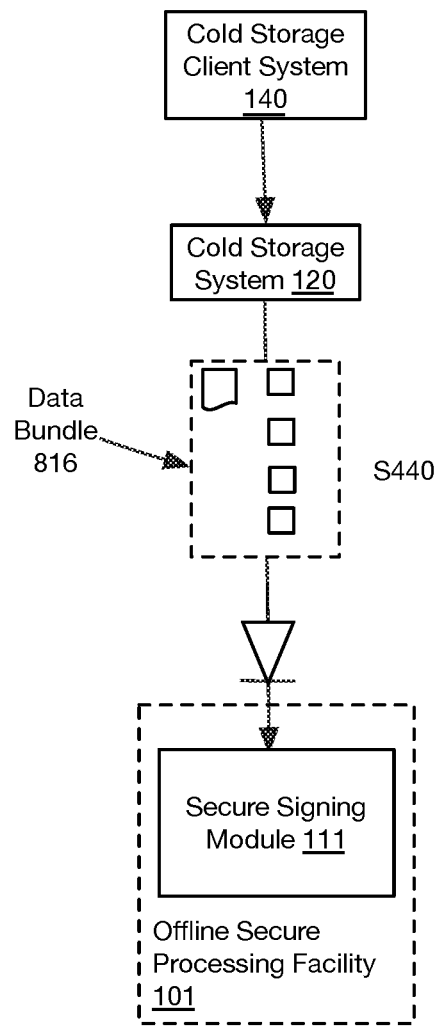
FIG. 10B is a representation of providing alpha shards to a secure signing system, in accordance with variations.
Figure 10C:
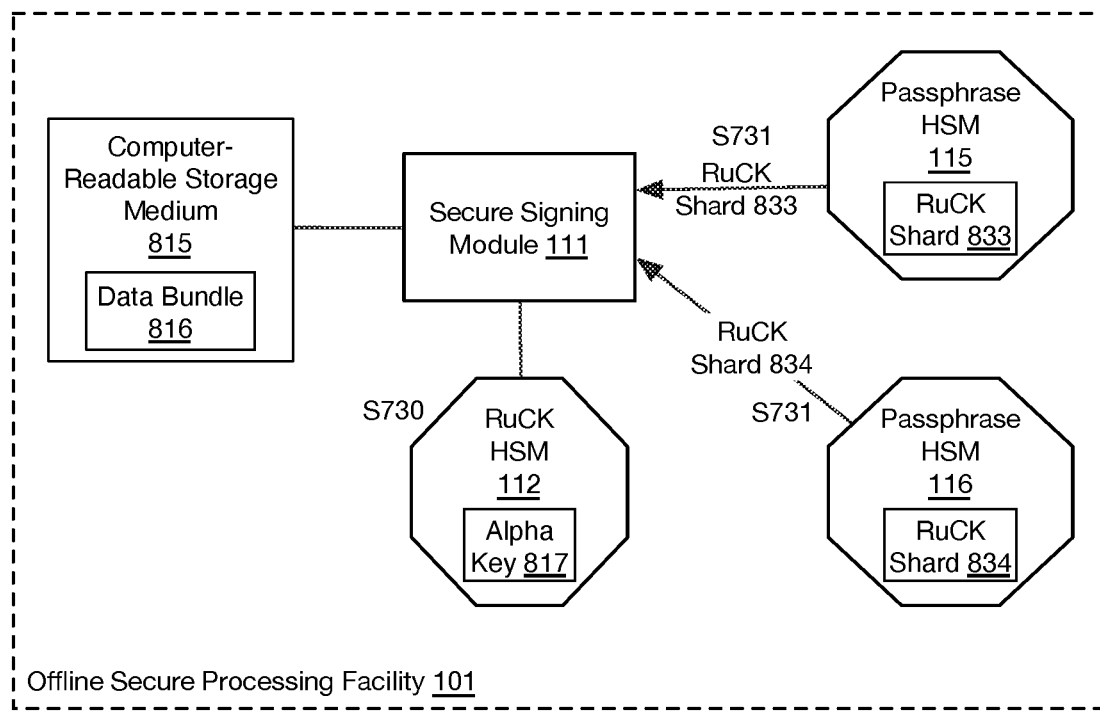
FIG. 10C is a representation of activating a reusable cold key hardware security module, in accordance with variations.
Figure 10D:
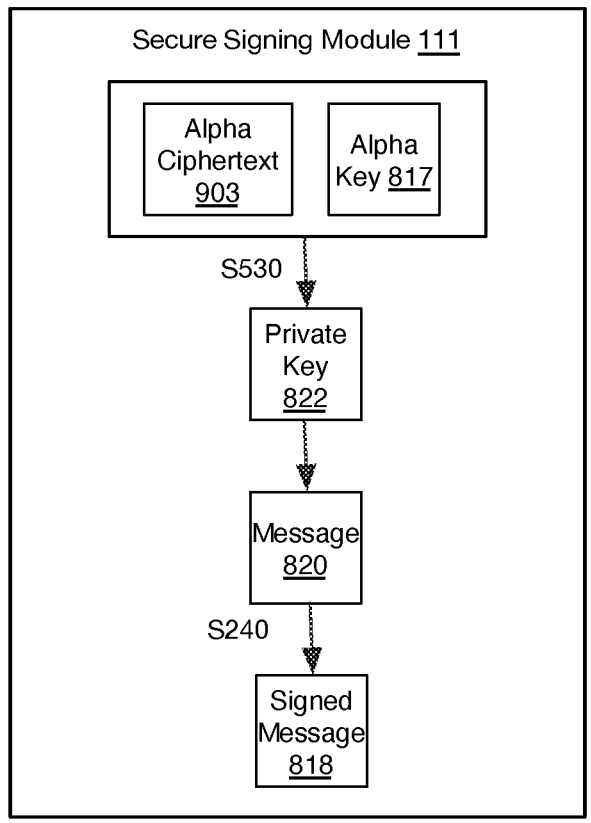
FIG. 10D is a representation of signing a message by using a restored message signing private key, in accordance with variations.
Figure 10E:
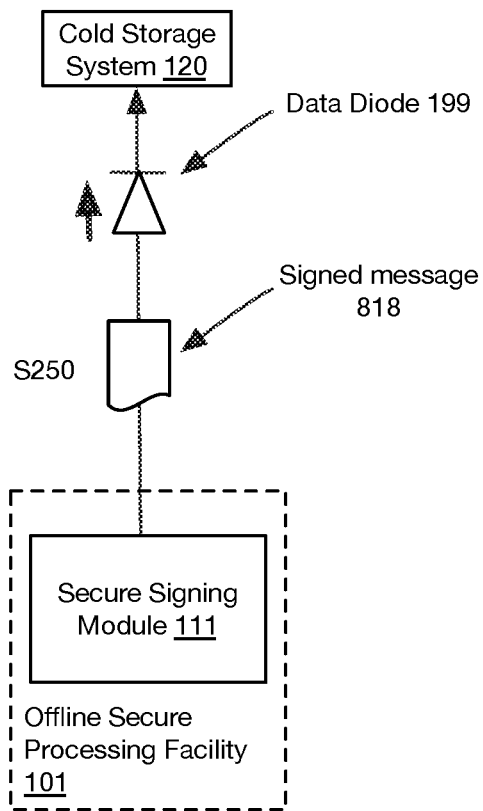
FIG. 10E is a representation of providing the signed message, in accordance with variations.

In some variations, the secure signing system 110 is implemented as a hardware device 800, as shown in FIG. 8. In some implementations, the hardware device includes one or more of a processor 803 (e.g., a CPU (central processing unit), GPU (graphics processing unit), NPU (neural processing unit), etc.), a display device 891, a memory 890, a storage medium 805, an audible output device, an input device 881, an output device, and a network device 811. In some variations, one or more components included in the hardware device are communicatively coupled via a bus 801 or other connection. In some variations, one or more components included in the hardware device are communicatively coupled to an external system via the network device 811.

The network device 811 functions to communicate data between the hardware device Boo and another device via a network (e.g., a private network, a public network, the Internet, and the like).

In some variations, the storage medium 805 includes the machine-executable instructions for performing at least a portion of the method 200 described herein.

In some variations, the storage medium 805 includes the machine-executable instructions for one or more of an operating system 830, applications 813, device drivers 814, and a secure signing module 111.

In some variants, the hardware device 800 is communicatively coupled (e.g., via the bus 801, etc.) to one or more of a hardware security module (HSM) (e.g., 115, 116, 112, etc.), a removable computer-readable storage medium 815 (e.g., DVD, CD-ROM, flash drive, etc.) that includes a data bundle 816, and/or other computing or storage system.

In some variants, during operation, the hardware device loads into the memory 890 machine-executable instructions for one or more of: an operating system (e.g., a secure operating system) 830, applications 813, device drivers 814, and the secure signing module 111.

During operation, the secure signing module 111 can load into the memory 890 (e.g., at a secure memory location of the memory 890) one or more of: a data bundle 816, alpha shards 819, a message 820 (to be signed), an alpha key 817, a message signing key 822, a signed message 818, a limited set thereof, and/or other information.

In some implementations, the secure signing system 110 includes a secure signing module 111. In some implementations, the secure signing module 111 is communicatively coupled to at least one HSMs (Hardware Security Modules) (e.g., 112, 113, 114, 115, 116). In some implementations, the secure signing module 111 is communicatively coupled to at least one of a Reusable Cold Key (RuCK) HSM (Hardware Security Module) 112 (e.g., the CKOS), a librarian HSM 113 (e.g., held by an entity managing the secure signing system or other entity; can be used to validate the entity's identity and/or store the passphrase for the CKOS or portion thereof), and a floater HSM 114 (e.g., held by user that is the same or different from the user managing the RuCK HSM and/or librarian HSM; can be used to validate the user's identity and store the passphrase for the CKOS and/or portion thereof).

In some variations, the secure signing system 110 operates within an off-line computing environment (e.g., the secure signing system 110 has no access to other devices via networks). In an example, the secure signing system 110 receives information from other devices via a user input device via a hardware bus (e.g., 801) of the secure signing system 110. Bus 801 can be: a peripheral bus (e.g., USB, lightning, etc.), internal bus (e.g., PCI, ATA, etc.), external bus (e.g., Lightning, Fieldbus), and/or other data bus. However, in some implementations, the secure signing system 110 can be configured to receive information from other components of the system 100 in any suitable off-line manner.

The offline storage (e.g., the HSMs, CKOS) can be: password protected; biometrically-protected; encrypted (e.g., to a public key corresponding to a secure signing system's private key; to a user's private key; etc.); unprotected; or otherwise protected. The offline storage's protection (e.g., password, private key) can itself be: sharded and distributed to different users (e.g., the same account managers holding the β-keys; to different users from the account managers; to the librarians; etc.), encrypted, password-protected (e.g., using a mnemonic, a password, etc.), or otherwise protected. The offline storage can be: separate, distinct, and transiently connectable to the secure signing module or secure signing system (e.g., be physically separate, such as an HSM); be a partitioned portion of the secure signing system or secure signing module; be a separate processor or chipset of the secure signing system or secure signing module; or be otherwise physically configured. The offline storage can include one or more secure cryptoprocessor chips, or be otherwise constructed. The offline storage is preferably securely connectable to the secure signing module or secure signing system, wherein the connection can be: digitally protected (e.g., via encryption), physically protected (e.g., via a security mesh), unprotected, or otherwise protected. The offline storage can: store cryptographic keys (e.g., the α-key), passwords (e.g., passwords for other HSMs or portions thereof, etc.), and/or store other data. The offline storage can optionally: decrypt ciphertext (e.g., decrypt the α-ciphertext to the message signing key), sign messages (e.g., sign the requested messages using the decrypted message signing key), and/or perform other functionalities.

In some variations, at least one HSM (e.g., 112) that is communicatively coupled to the secure signing module in includes at least one ceremony key (e.g., the α-key) that is used for reassembling a message signing private key used by the secure signing module 111 to sign a message received from the cold storage system 120. The CKOS preferably stores a single α-key, but can alternatively store multiple α-keys (e.g., for multiple ceremonies, multiple entities).

In some variations, the secure signing module in functions to sign messages for one message signing private key. In some variations, the secure signing module in functions to sign messages for a plurality of message signing private keys. In some variations, the offline secure processing facility 101 includes a plurality of secure signing modules in (executing on respective computing systems) that each function to sign messages for one or more message signing private keys. Each secure signing module 111 can be: dedicated to a single message signing private key or used for multiple message signing private keys (e.g., in series, in parallel).

In a first example, the offline secure processing facility 101 includes a secure signing system that includes a signing module that functions to sign for a plurality of private keys.

In a second example, the offline secure processing facility 101 includes a secure signing system that includes a plurality of signing modules that each function to sign for at least one private key.

In a third example, the offline secure processing facility 101 includes a plurality of secure signing systems that each function to sign for at least one private key.

In some variations, the upload client system 130 is a hardware device that is separate from the secure signing system no.

FIG. 8 shows a schematic representation of architecture of an exemplary hardware device 800.

The system can optionally be used with: a message signing key, an α-key (e.g., ceremony key) and a β-key, but can be used with any other suitable cryptographic key.

The message signing key is used to sign blockchain messages, wherein a blockchain network validates the signature to verify a transaction. The message signing key is preferably the private key of an asymmetric keypair (RuCK key pair), but can alternatively be any other suitable key. The message signing key can be: a master key, an extended key (e.g., consistent with a BIP protocol), a key derived from a seed phrase (e.g., wherein the seed phrase can be ciphered, split, stored, reconstructed, and deciphered in lieu of the message signing key), and/or any type of cryptographic key, consistent with any suitable cryptographic protocol (e.g., blockchain protocol). The message signing key is preferably associated with an entity and/or a set of users ("sages"), but can be otherwise owned.

The α-key is used to generate the α-ciphertext during the key generation ceremony, and can optionally be used to decrypt the reconstructed α-ciphertext during message signing. The α-key is preferably a symmetric key, but can alternatively be an asymmetric keypair (e.g., wherein the public key is used to encrypt the message signing key into α-ciphertext and the private key is used to decrypt the reconstructed α-ciphertext). The α-key is preferably specific to a given key generation ceremony, but can be shared across multiple key generation ceremonies. An identifier for the α-key (e.g., a hash) can optionally be determined and used to identify the β-shards generated from the respective α-ciphertexts. This can be particularly useful in quickly identifying and decommissioning the β-shards associated with a compromised α-key. The α-key is preferably only stored within a single CKOS, but can additionally or alternatively have copies stored in auxiliary CKOS's, in a digital format, or otherwise stored.

The β-key is used to enrypt the α-shards into β-shards and/or to decrypt the β-shards into α-shards. The β-key is preferably part of an asymmetric keypair, but can alternatively be a symmetric key. In a specific example, a public β-key is used to encrypt the α-shards into β-shards, and a paired private β-key is used to decrypt the β-shards into α-shards. The β-key (e.g., private β-key) is preferably retained and stored by a user (e.g., in an HSM, on paper, in a vault, etc.), while the public β-key can be retained and stored by the system or other storage. The user is preferably associated with the master signing key's entity, and is preferably geographically separated from the cold storage system and/or secure signing system, but can be otherwise associated and located.

The system can optionally be used with one or more blockchain messages. The blockchain messages are preferably associated with the public key paired with the message signing key (e.g., include the public key, include a hash of the public key, etc.). The blockchain messages can optionally include: transaction information (e.g., a destination address, amount of cryptocurrency to transfer, network fee limits, etc.), function calls, delegation information, and/or other information. The blockchain messages can include transactions to transfer cryptocurrency assets, transfer data, execute a smart contract method, participate in governance of a blockchain network, participate in operations of a blockchain network (e.g., staking, validating, etc.), or any suitable type of blockchain transaction. The blockchain messages can be unsigned (e.g., before signing with the message signing key) or signed (e.g., with the message signing key). The blockchain messages are preferably generated by a client (e.g., service, user, wallet, etc.), but can be generated by any other suitable system. The blockchain messages are preferably received from the client by the cold storage system, but can be received by another system. The blockchain messages are preferably signed by the secure signing system, but can be signed by another system.
4. Method.

Figure 2:
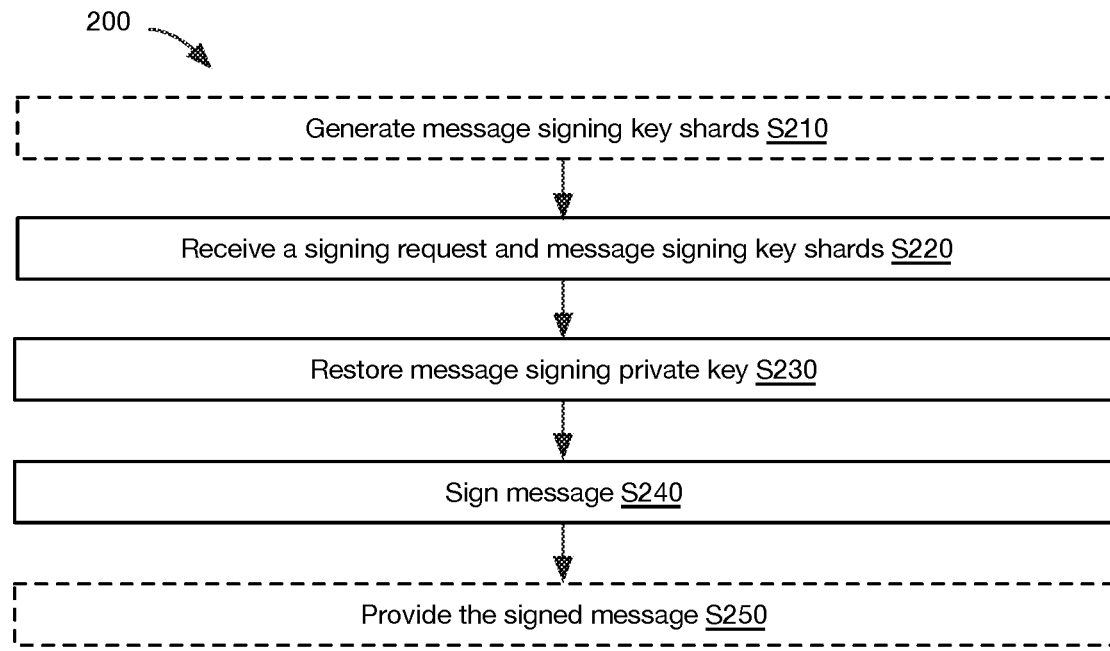
FIG. 2 is a representation of a method, in accordance with variations.

FIG. 2 is a flowchart representation of a method 200. In some variations, the method 200 includes at least one of: receiving a signing request and receiving message signing key shards for a message signing private key S220; restoring the message signing private key by using the message signing key shards S230; and signing a message using the restored message signing private key S240. In variants, the method includes providing the signed message S250. In variants, the method includes generating the message signing key shards for the message signing private key S210.

In some implementations, at least one component of the system 100 performs at least a portion of the method 200. In some implementations, at least one computing system located in the offline secure processing facility 101 performs at least a portion of the method 200. In some implementations, restoring the message signing private key (S230), and signing the message (S240) is performed entirely by one or more computing systems (e.g., 800 shown in FIG. 8) located at the offline secure processing facility 101.

Figure 3:
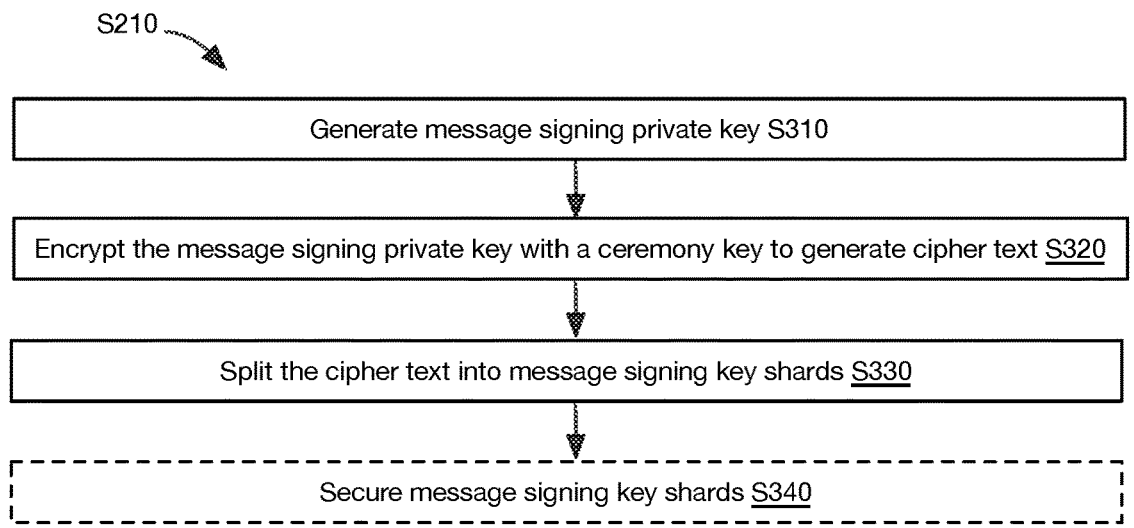
FIG. 3 is a representation of generating message signing key shards, in accordance with variations.

Generating key shards S210 functions to generate key shards that can be distributed to several locations (e.g., HSMs, account manages, etc.) and accessed at a later time to sign a message. Generating key shards S210 can include one or more of generating a message signing private key S310; encrypting the message signing private key with a symmetric key to generate ciphertext S320; splitting the ciphertext into message signing key shards into the message signing key shards (used to restore the message signing private key at S240), as shown in FIG. 3. The message signing key shards can be secured (e.g., at S340). In some implementations, processes S310, S320, S330, S340 are each performed entirely by one or more computing systems (e.g., a secure key generation computing system). In one example, S210 can be performed as described in U.S. application Ser. No. 16/386,786 filed 17 Apr. 2019, which is incorporated herein in its entirety by this reference, or performed in any other suitable manner.

Generating the message signing private key (S310) functions to generate a private key that can be used to sign messages. In some variations, the private key is generated offline (e.g., during a key generation ceremony) (e.g., at the offline secure processing facility ioi). In some variations, the message signing private key is generated as part of a public private key pair (RuCK key pair) that includes the message signing private key and a corresponding public key (e.g., that can be used to verify signatures generated by using the message signing private key).

A new RuCK key pair can be generated at any suitable time, and in response to any suitable trigger. In a first example, a new RuCK key pair is generated in response to a request received from the cold storage system 120 for a new RuCK key pair. In a second example, a new RuCK pair is generated to create a pool of available RuCK key pairs that can be provided to the cold storage system as needed. For example, if the cold storage system 120 needs a new cold storage address (or account) for cold storing cryptocurrency assets, the cold storage system 120 can request a new RuCK key, and in response to such a request, the new RuCK key pair is generated and provided to the cold storage system 120. The cold storage system 120 can then use the public key of the RuCK key pair to identify a cold storage blockchain destination for a blockchain transaction that transfers cryptocurrency from a source to cold storage.

In variants, the generated message signing private key is encrypted at S320 using a ceremony key (e.g., α-key 817 shown in FIG. 8). In some implementations, the signing private key is encrypted using AES encryption. The ceremony key (α-key) is preferably a symmetric key, but can alternatively be the public key of an asymmetric key pair, wherein the private key of the pair is stored in the offline storage (CKOS, e.g., RuCK HSM 112), or be any other suitable key type. In some variations, the ceremony key is securely stored in an HSM (e.g., 112). In some implementations, securely storing the ceremony key in the HSM 112 includes encrypting the ceremony key with a key of the HSM 112 (e.g., a public key of the HSM, a private key of the HSM, a ceremony key of the HSM). In some implementations, encrypting the ceremony key with the key of the RuCK HSM 112 includes unlocking the RuCK HSM for use by using a passphrase for unlocking the RuCK HSM, and once unlocked, using a key of the RuCK HSM to encrypt the ceremony key. In some implementations, the passphrase required to unlock the RuCK HSM 112 is sharded, and at least t of n shards are required to recover the passphrase for unlocking the RuCK HSM 112. In some variations, the shards are provided by at least two HSMs (e.g., 113 and 114).

In some variations, the ceremony key (e.g., key 817 shown in FIG. 8) is used to encrypt the private key and is generated in the offline secure processing facility 101, and the ceremony key is securely transported to the RuCK HSM 112 during the key generation ceremony. The ceremony key can be securely transported to the RuCK HSM 112 in any suitable manner. In a first example, the ceremony key is stored on a storage device, the storage device is coupled to the RuCK HSM 112 (either directly, or via a secure, off-line computing device), and the ceremony key is copied from the storage device to the RuCK HSM. For example, the storage device that stores the generated ceremony key is coupled to the secure signing system 110, the secure signing system 110 is coupled to the RuCK HSM 112, and the ceremony key is copied from the storage device to the RuCK HSM 112 via the secure signing system 110. In a second example, the ceremony key is stored at the RuCK HSM 112 via a user interface. For example, the secure signing system 110 can be coupled to (or include) a user input device (e.g., a keyboard, a touchscreen, etc.) that receives user input that represents the ceremony key (or information that can be used to generate the ceremony key), and the secure signing system 110 receives the user input via the user input device. In a case where the user input represents the ceremony key, the secure signing system 110 stores the ceremony key in the RuCK HSM 112. In a case where the user input represents information that can be used to generate the ceremony key, the secure signing system 110 generates the ceremony key by using the user input, and stores the ceremony key in the RuCK HSM 112. In a third example, the ceremony key is stored at the RuCK HSM 112 via a secure network interface. For example, a first system (e.g., a secure, off-line computing system) generates the ceremony key, establishes a secure connection with the secure signing system 110, and transmits the ceremony key to the secure signing system no via the secure connection. The secure signing system 110, receives the ceremony key and stores the ceremony key in the RuCK HSM 112 (which is communicatively coupled to the secure signing system 110. The secure connection can be a dedicated, un-shared communication link between the first system and the secure signing system 110, and both the first system and the secure signing system 110 can be located in the offline secure processing facility 101. The secure communication link can be implemented using a direct wired connection between a communication device of the first system and the secure signing system no. In a fourth example, the ceremony key can be directly stored on the RuCK HSM 112 during the key generation ceremony, wherein the RuCK HSM 112 is physically transported to the secure signing system. In a fifth example, the RuCK HSM 112 generates the RuCK keypair, and sends the public key to a public repository (e.g., for subsequent client access). However, the ceremony key can be otherwise stored on the RuCK HSM 112.

Splitting the encrypted ciphertext (α-ciphertext) (S330) functions to split the ciphertext of the encrypted message signing private key (generated at S320) into n shards (n α-shards) such that t of n shards can reconstruct the ciphertext. In some implementations, the α-ciphertext is split into shards by performing a Shamir's Secret Sharing process. However, the α-ciphertext (alpha ciphertext, e.g., 903 shown in FIG. 9) can be otherwise split.

Message signing key shards (α-shards) can be secured at S340 in any suitable manner. In a first example, α-shards are deleted, overwritten, lost when the key generation system is depowered, or otherwise discarded. In second example, at least one α-shard can be printed (or otherwise formed) on a substrate (e.g., paper, plastic, metal), and optionally physically stored in a secure manner (e.g., in a safe, etc.). The α-shards can be encrypted in a non-textual medium, such as a barcode or QR code; encrypted with a key; cleartext, or in any other suitable format. In a third example, at least one α-shard (alpha shard) can be securely transmitted (e.g., via a secure communication link) to a computing device (e.g., a mobile computing device, computing workstation, server, data center, etc.). The α-shard can be encrypted before being transmitted to the computing device. Additionally, or alternatively, the α-shard can be encrypted at the computing device. In a fourth example, at least one α-shard can be securely stored in an HSM that is coupled to the computing device that generates the α-shard. However, α-shards can otherwise be secured such each α-shard is accessible by only an authorized set (e.g., of one or more) account managers. In some implementations, each α-shard is accessible by only one authorized account manager. In some implementations, at least one account manager is a human. Additionally, or alternatively, at least one account manager can be a computing system that functions to provide at least one α-shard in response to a request for α-shards for a RuCK asymmetric key pair (e.g., via an API of the computing system, etc.).

In variants, securing message signing key shards (α-shards) S340 functions to encrypt each shard (α-shard) to an account manager (e.g., a sage) by using a key (β-key, e.g., 901 shown in FIG. 9) of the respective account manager (e.g., a public key of an asymmetric key pair), thereby generating doubly-encrypted shards (β-shards). In some implementations, each β-key (beta key) is a public key of an HSM owned by a respective account manager, and the private key used to decrypt the associated β-shard is securely managed by the an HSM or other secure computing system.

In some variants, at least one private key used to decrypt the associated β-shard is stored outside of the offline secure processing facility. Even if all of the β-shards (beta shards) have been accessed and decrypted (thereby providing the α-shards), the ceremony key is still needed to recover the message signing private key. And the ceremony key is secured at the offline secure processing facility 101. By virtue of requiring a ceremony key (secured at the offline secure processing facility) to recover the message signing private key, the β-shards (and the respective β-keys) can be managed outside of the offline facility, and the account managers do not have to be located within the offline secure processing facility to recover the message signing private key. Even if the cold storage system 120 accesses the α-shards by communicating with other computing systems via a network, the message signing public key cannot be maliciously recovered without compromising security of the secure offline processing facility 101.

In some variants, at least one private key used to decrypt the associated β-shard is stored within the offline secure processing facility 101.

In some variations, the encrypted shards (β-shards) are securely stored. In some variations, the β-shards are stored outside of the offline secure processing facility 101. In some variations, the β-shards are stored at the offline secure processing facility 101. In some variations, QR codes representing each β-shard are generated, and each QR code is printed, such that each β-shard can be identified and converted to a digital format by scanning the QR codes from the paper printouts. In some variations, securely storing the β-shards includes removing the β-shards from memory and storage devices, such that the only representations of the β-shards are the printouts with the QR codes. In some variations, the β-shards are stored in association with the corresponding public key. In some implementations, the public key is printed on the printouts (e.g., in cleartext) that include the β-shard QR codes.

In some variations, each encrypted shard (β-shard) is stored in association with information that identifies an account manager (or HSM) that has access to the key required to decrypt the encrypted shard. In this manner, each encrypted shard can be sent to a computing device (or HSM) of the associated account manager.

In some variations, the computing system (e.g., a key generation computing system) that generates the message signing private key (at S310) provides the cold storage system 120 with RuCK information identifying the public key associated with the message signing private key. In some implementations, the RuCK information identifies the public key as a public key of a Re-usable Cold Key (RuCK) asymmetric key pair. In some variants, the RuCK information also identifies the storage locations or entities (e.g., account managers) that manage the β-keys that are used to restore the message signing private key that corresponds to the public key. In variants, the RuCK information can identify one or more of: contact information (e.g., e-mail addresses, phone numbers, etc.) for account managers that manage the α-shards; API endpoints (Application Programming Interface) for computing systems that mange the α-shards; and authentication information for remote storage locations that store the α-shards. However, RuCK information can include any suitable type of information that can be used to access the α-shards.

The cold storage system 120 can then use this RuCK public key for cold storage purposes, and recognize that data secured by this public key is re-usable, meaning that it can be used in more than one encryption operation. In a first variant, the cold storage system uses the RuCK public key as a cold storage blockchain endpoint. In a second variant, the cold storage system 120 uses the RuCK public key to generate a cold storage blockchain endpoint (e.g., by hashing the RuCK public key, etc.). However, the RuCK public key can otherwise be used for cold storage purpose.

For example, the cold storage system 120 can use the RuCK public key as a blockchain endpoint (e.g., address, account) and assign this RuCK public key to a user. If an entity wishes to transfer ownership of data (e.g., an amount of cryptocurrency, data, etc.) to the user, the entity can generate a transaction by using the RuCK public key to designate the user as the new owner of the data. The user can be designated as the new owner of the data by encrypting at least a portion of the data or the transaction with the RuCK public key. In variants, the entity transferring ownership can be related to the user, and such a transfer of ownership can include the user transferring custody of the data from current digital wallet to a cold storage digital wallet that is secured by the RuCK asymmetric key pair.

Because the RuCK key pair is reusable, a portion of the data (e.g., a portion of cryptocurrency) secured by the RuCK key pair can be transferred to another user (or entity), while the remaining data is still secured by the RuCK key pair. By virtue of the processes for signing transactions using RuCK private keys (described herein), the cleartext version of the private key (message signing private key) is not accessible outside a secure signing module (e.g., 111) running in an offline secure processing facility (e.g., 101). Therefore, the risk of malicious entities accessing the private key during message signing is reduced, as compared to conventional signing of transactions using cold storage keys. Because the security of the private key is less likely to be compromised after message signing (according to the processes described herein), the RuCK asymmetric key pair can continue to be used for storing the remainder of the data that is not transferred during the initial transfer. When the cold storage system 120 receives the RuCK public key, it recognizes (from the received RuCK information) that the RuCK public key corresponds to a reusable cold storage key. In some implementations, the cold storage system 120 stores RuCK information for each received RuCK public key, and uses the stored RuCK information to identify each RuCK public key that is used (or can be used) by the cold storage system 120, such that the cold storage system 120 can identify a message signing request that involve uses of a RuCK asymmetric key pair.

In variants, message signing using the RuCK private key is performed in response to receiving a signing request at S220. In some variations, the cold storage system 120 receives a message signing request from the cold storage client system 140 (S410 shown in FIG. 4).

In some variations, the signing request identifies a message to be signed (e.g., a blockchain transaction). In some variations, the signing request identifies a public key used to verify a signature for the signed message.

In some implementations, the signing request is a request to sign a blockchain transaction. In some implementations, the blockchain transaction identifies a blockchain address or account, and the signing request is a request to sign the blockchain transaction with a signature for the blockchain address or account.

Figure 4:
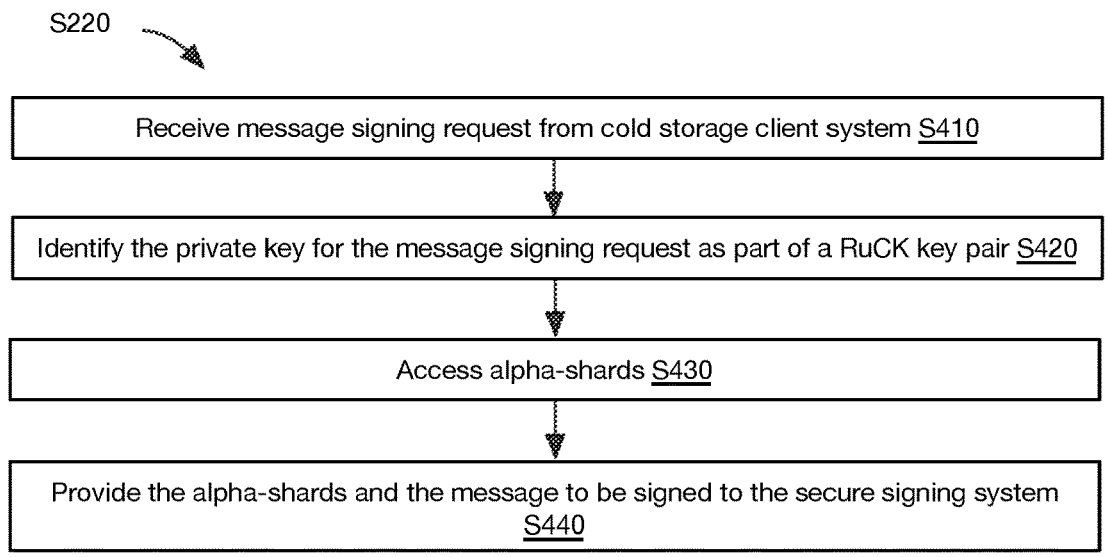
FIG. 4 is a representation of providing alpha shards and a message to be signed to a secure signing system, in accordance with variations.

In some variations, the cold storage system 120 determines whether the public key identified in the signing request corresponds to a re-usable cold key (e.g., by using the stored RuCK information) (S420 shown in FIG. 4). In an example, the message is a blockchain transaction, the cold storage system 120 identifies a source blockchain address (or account) of the blockchain transaction, and the cold storage system 120 determines whether the source address (or account) is associated with a re-usable cold key (e.g., by accessing data that identifies blockchain addresses and/or accounts that are associated with re-usable cold keys). In response to a determination that the public key of the message (e.g., the public key associated with the source of the blockchain transaction) corresponds to a re-usable cold key (RuCK), the cold storage system 120 sends a request to the secure signing system 110 to have the message signed with the associated RuCK private key.

In an example, the blockchain transaction identifies the address (or account) by using a public key of a RuCK key pair (or data generated by using the public key of the RuCK key pair). For the blockchain transaction to be validated and recorded on a respective blockchain, the blockchain transaction (identifying the address or account using the RuCK public key) needs to be signed by using the RuCK private key that corresponds to the RuCK public key used to generate the blockchain transaction. In this example, since the cold storage system 120 does not store the RuCK private key (or otherwise have direct access to the RuCK private key), the cold storage system 120 sends a signing request to the secure signing system 110 (which can access the RuCK private key) so that the secure signing system no can sign the blockchain transaction with the RuCK private key and return a signature for the blockchain transaction.

In variants, the cold storage system 120 controls the secure signing system no to sign the message by providing the secure signing system no with the message and additional information used to access the private key used to sign the message. In some implementations, the additional information used to access the message signing private key (used to sign the message) includes the α-shards that correspond to the public key identified in the signing request. At S430 (shown in FIG. 4) the cold storage system 120 access the α-shards. In variants, the cold storage system 120 accesses the α-shards from a plurality of account managers asynchronously. The cold storage system 120 can access the α-shards from the account mangers via one or more of a user input device, a private network, and a secure network. In some examples, the cold storage system 120 accesses the α-shards from the account managers within an on-line computing environment.

In some implementations, the cold storage system accesses the α-shards by using the RuCK information, which identifies the account managers that manage the α-shards for the RuCK private key associated with the public key identified in the signing request. Using the RuCK information, the cold storage system 120 identifies the account managers that manage the α-shards, and sends a shard request to each account manager.

In variants, the cold storage system 120 uses the upload client system 130 to access the α-shards. In a first variant, the cold storage system 120 accesses the α-shards directly from the upload client system. In some implementations, the cold storage system 120 sends a shard request to the upload client system 130. In a first example, the shard request identifies at least a portion of the RuCK information for the public key of the message signing request, and the upload client system uses the RuCK information to access the α-shards to return to the cold storage system. For example, the shard request can include a list of account managers that mange the α-shards needed to sign the message, the upload client system can notify the account managers, and receive the α-shards from each account manager (e.g., via a user interface, via an API, via a network connection, etc.). Notifying the account managers can include digitizing the β-shards of the corresponding message signing key and sending the account managers all or a subset of digitized β-shards, wherein each account managers can decrypt a subset of the digitized β-shards into α-shards using the β-key managed by the respective account manager. In a second example, the shard request identifies the public key for the message signing request, and the upload client system uses the public key to access the α-shards to return to the cold storage system. For example, the upload client system 130 can use the public key to identify the account managers that mange the α-shards needed to sign the message, the upload client system can notify the account managers, and receive the α-shards from each account manager (e.g., via a user interface, via an API, via a network connection, etc.).

In a second variant, the cold storage system 120 accesses (from the upload client system 130) data (e.g., β-shards) that can be used to obtain the α-shards. In some implementations, the cold storage system 120 sends a shard request to the upload client system 130. The shard request sent to the client system 130 requests the encrypted shards (β-shards) for the private key corresponding to the public key of the message received at S220.

In some implementations, the upload client system 130 accesses the encrypted shards (β-shards) (e.g., from a storage device, from an HSM, from a user input device, from an image captured by an image sensor, by scanning a printout that includes a QR code for the shard, etc.). In some implementations, the client system 130 securely transports the encrypted shards (β-shards) to the cold storage service 120 (e.g., via a secure communication link, etc.).

In variants, accessing the α-shards (S430) includes decrypting the encrypted shards (e.g. β-shards) and providing the decrypted shards (the α-shards) to the secure signing system 110. In a first variation, the cold storage system 120 orchestrates decryption of the encrypted shards (e.g., β-shards) (which are encrypted with keys of account managers) into α-shards (which are encrypted with the ceremony key, which is stored at the secure signing system 110) by the account managers (e.g., sages) whose keys were used to encrypt the β-shards.

Figure 6:
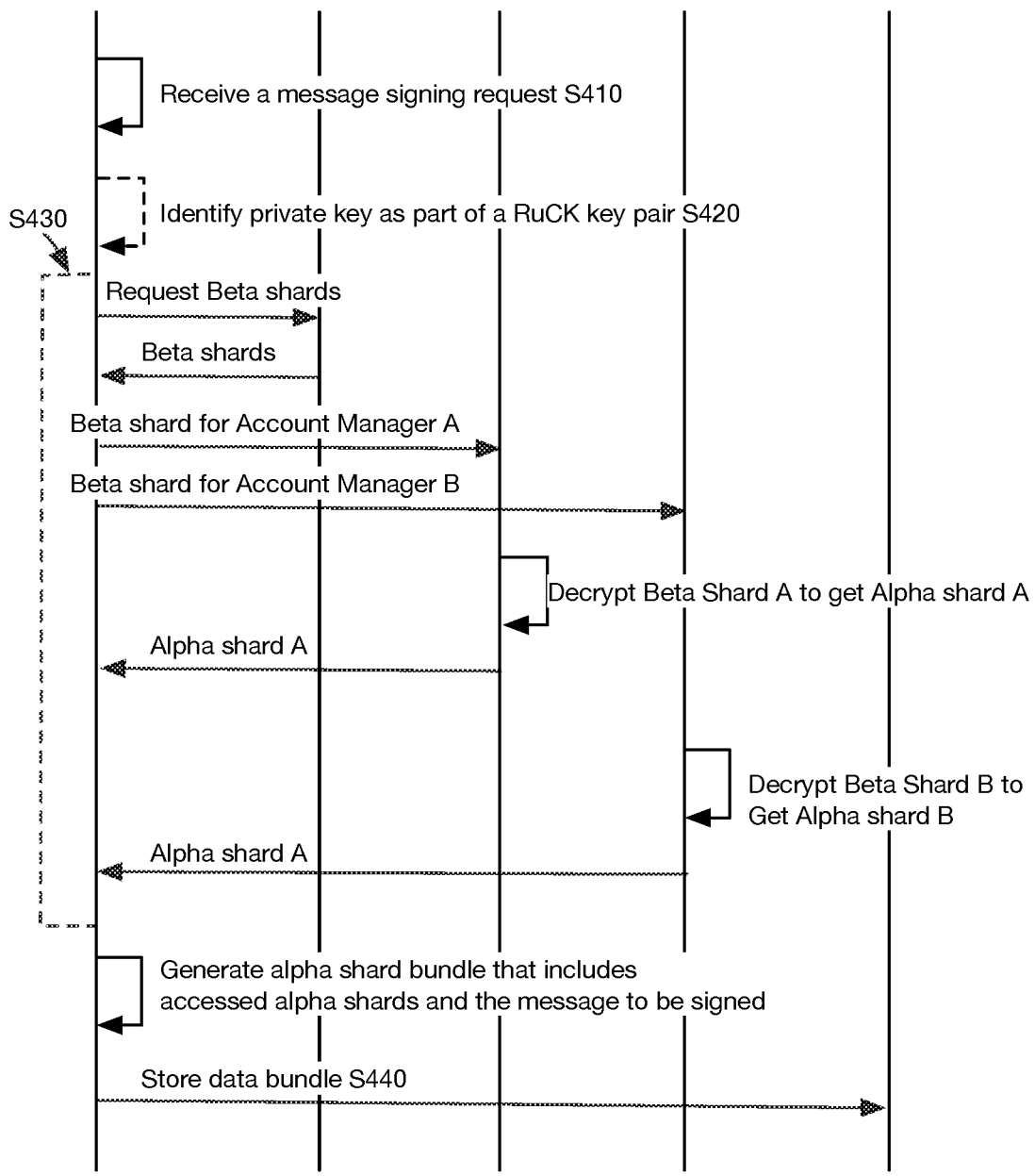
FIG. 6 is a representation of providing alpha shards and a message to be signed to a secure signing system, in accordance with variations.

In some implementations, the cold storage system 120 receives user input from t of n of the account managers via a user input device (e.g., keyboard, scanner, camera, etc.) of the cold storage system 120, and uses the user input to decrypt the β-shards. In some implementations, the cold storage system 120 receives the α-shards (accessed by decrypting the β-shards) from t of n computing systems (e.g., 601 and 602 shown in FIG. 6, 1010 shown in FIG. KA), each associated with a different account manager.

In some implementations, the cold storage system 120 receives the α-shards via a user input device (e.g., keyboard, scanner, camera, etc.) of the cold storage system 120.

In some variations, the cold storage system provides the α-shards and the message to be signed to the secure signing system (S440 shown in FIG. 4). Alternatively, the α-ciphertext can be provided instead of (or in addition to) the α-shards. In some variations, the cold storage system 120 provides the α-shards and the message to be signed to the secure signing system in response to receiving t of the n α-shards for the public key (e.g., from the account managers, from the upload client system 130, etc.).

In some implementations, the cold storage system 120 provides the α-shards and the message to be signed to the secure signing system by generating a data bundle (e.g., 816 shown in FIG. 8) that includes the α-shards (e.g., 819 shown in FIG. 8) and the message to be signed (e.g., 820 shown in FIG. 8), and provides the data bundle to the secure signing system. In some implementations, the cold storage system 120 encrypts the data bundle with a public key of the secure signing module (e.g., public key of the RuCK HSM 112), and signs the data bundle with a private key of the cold storage system.

In some variations, the cold storage system 120 securely transports the data bundle to the secure signing system 110. In a first implementation, the data bundle is securely transported by using a data diode (e.g., via a data diode 198). In a first example, a computer-readable storage medium (e.g., a DVD-ROM, an immutable storage device, etc.) functions as a data diode, and the cold storage system 120 stores the data bundle on the computer-readable storage medium. In one example, the method can include downloading the data bundle to a local computing system to store the data bundle on the computer-readable storage medium. In this example, the identity of the computing system and/or user downloading the data bundle can be verified prior to downloading (e.g., by verifying that the requesting machine has a whitelisted IP address or other identifier, using out-of-band authentication, such as 2 factor authentication, etc.).

In variants, the computer-readable storage medium is a removable storage medium that can be coupled to a first computing system to receive and store data provided by the first computing system, decoupled from the first computing system, and then coupled to a second computing system to provide the stored data to the second computing system. In some variations, providing the data bundle to the secure signing system includes decoupling the computer-readable storage medium from the cold storage system 120, physically transporting the computer-readable storage medium (e.g., 815 shown in FIG. 8) to the offline secure storage processing facility 101, and communicatively coupling the storage medium with the secure signing system 110 (e.g., by inserting the computer-readable storage medium into a drive bay of a computer implementing the system 110, by coupling the storage medium to a bus, etc.).

Figure 5:
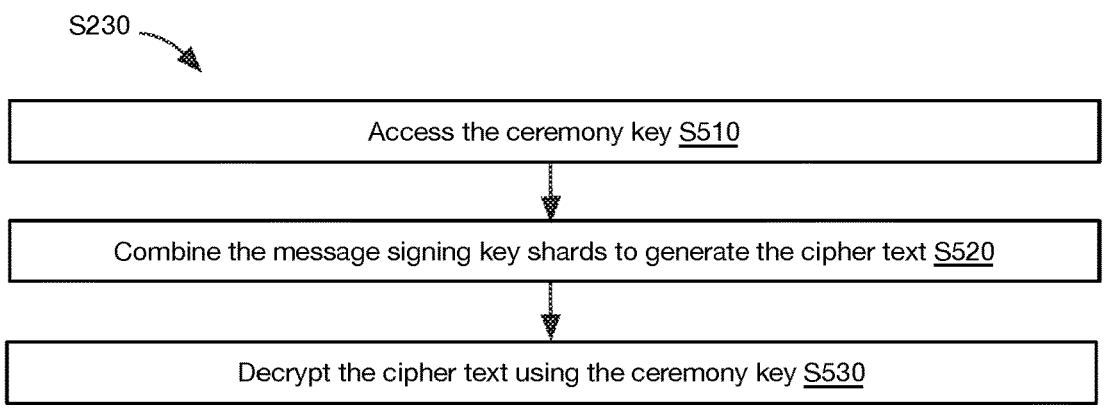
FIG. 5 is a representation of restoring a message signing private key, in accordance with variations.
Figure 7:
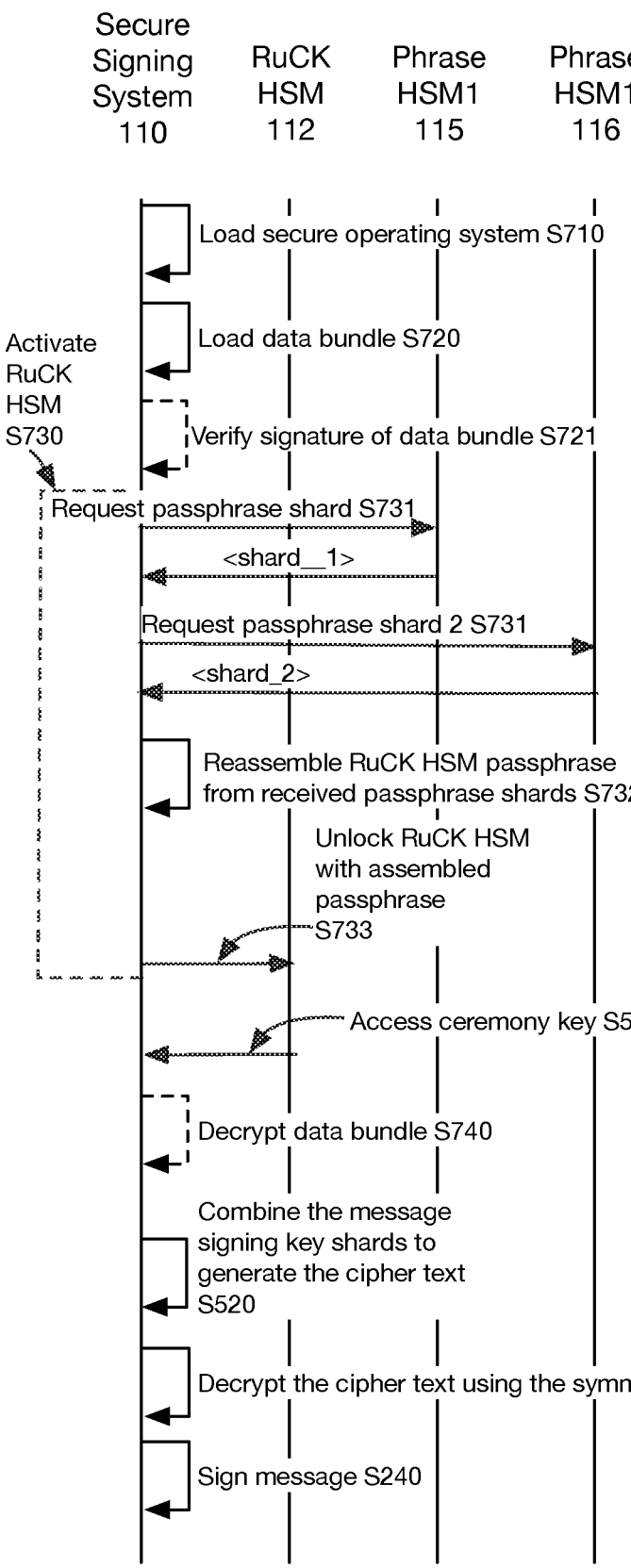
FIG. 7 is a representation of signing a message using a restored message signing private key, in accordance with variations.

In variants, restoring the message signing private key S230 functions to reassemble the private key (e.g., 822 shown in FIG. 8) by using the α-shards (e.g., 819 shown in FIG. 8). In some variations, the secure signing system 110 restores the message signing private key at S230. Variants of restoring the message signing private key are shown in FIGS. 5 and 7. As shown in FIG. 5, restoring the message signing private key can include: accessing the ceremony key S510; combining the message signing key shards (α-shards) to generate ciphertext S520; and decrypting the ciphertext using the ceremony key, to obtain the message signing private key (S530). As shown in FIG. 7, restoring the message signing private key can optionally include one or more of: loading a secure operating system S710; loading a data bundle S720; verifying a signature of the data bundle S721; decrypting the data bundle S740; and activating a RuCK HSM S730. Activating the RuCK HSM S730 can include one or more of: requesting at least one passphrase shard S731; reassembling a RuCK HSM passphrase from received passphrase shards S732; and unlocking the RuCK HSM using the assembled passphrase S733. However, the message signing private key can be otherwise restored.

The secure signing system 110 can be loaded with a secure operating system (e.g., 810 shown in FIG. 8) (S710 shown in FIG. 7). In variants, the secure operating system 810 is an operating system that performs operations in RAM 890, and does not store information or artifacts on a non-transitory storage medium. The secure signing module 111 is preferably loaded at the secure signing system 110 (e.g., in RAM 890).

The data bundle (e.g., 816 shown in FIG. 8) is preferably loaded at the secure signing system 110 from the computer-readable storage medium (e.g., 815 shown in FIG. 8) (e.g., into RAM 890 shown in FIG. 8) (S720 shown in FIG. 7). In some implementations, the computer-readable storage medium is a DVD-ROM that stores the data bundle, and loading the data bundle includes loading the DVD-ROM from a DVD reader that is communicatively coupled (or included in) the secure signing system 110.

The signature of the data bundle 816 is preferably verified as a valid signature for the cold storage system 120 (S721 shown in FIG. 7). In some variations, the secure signing system 110 verifies the signature of the data bundle 816 by using a public key of the cold storage system 120 that is used for verifying signatures of the cold storage system 120. In some implementations, if signature verification fails, the message signing process aborts.

In some variations, activating the RuCK HSM 112 (S730) includes reassembling a passphrase required to unlock the RuCK HSM 112 for use (S732 shown in FIG. 7). In some implementations, the secure signing module 111 reassembles the passphrase. However, in other implementations, the passphrase can be reassembled in a secure manner by other components included in the offline secure processing facility 101.

In some variations, at least two passphrase shards (e.g., 833, 834 shown in FIG. 8) are accessed (e.g., at S731 shown in FIG. 7) and used to reassemble the RuCK HSM passphrase. For example, the RuCK HSM passphrase can be sharded into n shards (e.g., by using a Shamir's Secret Sharing process), such that t of n shards (or another proportion of another number of shards) are required to reassemble the passphrase. In some implementations, each RuCK HSM passphrase shard is securely stored by a respective HSM (e.g., 115, 116 shown in FIG. 1). In some implementations, the secure signing module 111 accesses the passphrase shards (e.g., at S731 shown in FIG. 7). However, in some implementations, any the shards can be accessed in a secure manner by other components included in the offline secure processing facility 101.

In some implementations, accessing the passphrase shards for the RuCK HSM passphrase includes unlocking at least t passphrase HSMs (e.g., 115, 116) storing RuCK HSM passphrase shards. In some variations, the passphrase HSMs storing the passphrase shards are unlocked by using user input received via a user interface (e.g., input keys included in the passphrase HSM, a user interface provided by a computing system communicatively coupled to the passphrase HSM via a bus, etc.). In some implementations, unlocking the passphrase HSMs storing the passphrase shards includes communicatively coupling the passphrase HSMs (e.g., 115, 116) storing RuCK HSM passphrase shards to the secure signing system 110 (e.g., via a bus, a network, etc.), and unlocking each of the t HSMs by using user input received via a user interface of the secure signing system 110. In some implementations, unlocking the passphrase HSMs storing the passphrase shards includes communicatively coupling the passphrase HSMs (e.g., 115, 116) storing RuCK HSM passphrase shards to a computing device (different from the secure signing system 110) (e.g., via a bus, a network device, etc.), and unlocking each of the t HSMs by using user input received via a user interface of the computing device.

In some implementations, the secure signing module 111 accesses the passphrase shards (e.g., 833, 834). In some implementations, the passphrase HSMs (e.g., 115, 116) are communicatively coupled to the secure signing system 110 (e.g., via a bus 801, a network device 811, etc.), and the secure signing module 111 accesses the passphrase shards from the unlocked HSMs. In some implementations, the secure signing module 111 accesses the passphrase shards from at least one of a user interface, a network device (e.g., 811), and a bus (e.g., 801) of the secure signing system 110.

In some implementations, the secure signing module 111 reassembles the passphrase using the accessed shards (e.g., 833, 834) (S732 shown in FIG. 7). In some implementations, the secure signing module 111 uses a Shamir's Secret Sharing process to reassemble the RuCK HSM passphrase from the shards. In variants, reassembling the passphrase shards produces a ciphertext version of the RuCK HSM passphrase, and the ciphertext version of the passphrase is decrypted to produce the cleartext passphrase that can be used to unlock the RuCK HSM 112. In variants, the librarian HSM (e.g., 113 shown in FIG. 1) (or other transiently or permanently connected storage) stores the key needed to decrypt the ciphertext version of the RuCK HSM passphrase. However, the RuCK HSM can be secured in any suitable manner, and later accessed (e.g., by performing a decryption process, etc.) in any suitable manner.

In some implementations, the secure signing module 111 uses the RuCK HSM passphrase to unlock the RuCK HSM 112 (S733 shown in FIG. 7).

Accessing the ceremony key S510 functions to access the ceremony key (e.g., 817 shown in FIG. 8), which is used to decrypt the α-ciphertext generated by reconstructing the α-shards. The ceremony key can be accessed by the secure signing module 111, by a user connected to the secure signing module 111, by the cold storage system 120, and/or another system. In a first variation, the ceremony key (α-key) is retrieved from the unlocked RuCK HSM 112. In a second variation, the ceremony key is itself encrypted, and is decrypted using a decryption key, wherein the decryption key can be provided by a user, reconstructed from shards, or otherwise obtained. In a third variation, the ceremony key is accessed from the RuCK HSM via one of a bus (e.g., 801) and a network device (e.g., 811). However, the ceremony key can be otherwise obtained.

Decrypting the data bundle received from the cold storage system 120 (S740 shown in FIG. 7) can be performed by the secure signing module 111. In some variations, the secure signing module 111 accesses (from the unlocked RuCK HSM 112) a private encryption key that is used for decrypting messages signed by using the public key of the RuCK HSM 112. In some variations, the secure signing module 111 uses the private encryption key of the Ruck HSM (e.g., ceremony key, other RuCK key) to decrypt the data bundle 816. However, any other suitable decryption key can be used.

In variants, after the α-shards are accessed by the secure signing system module 111, the secure signing module 111 (of the secure signing system no) combines the α-shards (e.g., 819 shown in FIG. 8) included in the decrypted data bundle (e.g., 816) (S520 shown in FIG. 5). In some variations, the secure signing module 111 combines the α-shards by performing a Shamir's Secret Sharing process. In variants, the result of combining the α-shards is an encrypted version of the message signing private key (e.g., the α-ciphertext generated at S320 shown in FIG. 3), and the encrypted version of the message signing private key is decrypted (at S530). In variants, the α-ciphertext is decrypted by using the ceremony key accessed at S510, to recover the message signing private key generated at S310. The α-ciphertext can be decrypted by the RuCK HSM, by the secure signing module, or by any other suitable system.

Once the message signing private key has been restored (at S230), the message received at S220 can be signed (at S240 shown in FIG. 2), to generate a signed message. The message can be signed using the restored message signing private key. The message can be signed by the secure signing module 111, the RuCK HSM, and/or by any other suitable system. Digital versions of the message signing private key, the reconstructed ceremony key, the α-shards, and/or any other suitable data generated prior to signing (at S240) can be discarded or otherwise managed after message signing or after respective data use. A transaction log or signing log associated with the RuCK HSM, the secure signing module 111, and/or the secure signing system 110 can optionally be updated based on message signing (e.g., with signing parameters, such as the public key, a message identifier, the requesting client, the signing timestamp, etc.).

After message signing, the signed message (818 shown in FIG. 8) is provided to the cold storage system 120 (S250). However, in variants, the signed message can be provided to any suitable system. In some variations, the secure signing module 111 generates a signed message data bundle. In some variations, the secure signing module 111 generates the signed message data bundle by encrypting the signed message with a public key of the cold storage system 120, signing the encrypted and signed message by using a private key of the RuCK HSM 112, and including encrypted signed message and the RuCK HSM's signature in the signed message data bundle. Alternatively, the signed message can be unencrypted, unprotected, or otherwise protected. In some variations, the secure signing module 111 includes an HSM transaction log of the RuCK HSM in the signed message data bundle. In some variations, the secure signing module 111 includes a signing transaction log in the signed message data bundle, wherein the signing transaction log identifies message signing transactions performed by the secure signing module 111.

In some variations, the signed message data bundle is provided to the cold storage system 120. In some variations, the signed message data bundle is provided to the cold storage system 120 via a data diode (e.g., 199 shown in FIG. 1). In some variations, the signed message data bundle is stored on a removeable storage medium (e.g., a DVD-ROM, HSM, etc.) and the storage medium is transported to the cold storage system 120.

In variants, the computer-readable storage medium storing the signed message data bundle is a removable storage medium. In some variations, providing signed message data bundle to the cold storage system 120 includes decoupling the computer-readable storage medium from the secure signing system 110, physically transporting the computer-readable storage medium to the cold storage system 120, and communicatively coupling the storage medium with the cold storage system 120 (e.g., by inserting the computer-readable storage medium into a drive bay of a computer implementing the system 110, by coupling the storage medium to a bus, etc.).

In some variations, the storage medium includes a signing transaction log, wherein the signing transaction log identifies message signing transactions performed by the secure signing module 111.

In some variations, the cold storage system 120 accesses the signed message data bundle, and verifies that the signature is a valid signature of the Ruck HSM and/or secure signing module. In some implementations, if the signature is not validated, the signed message data bundle is discarded. In some variations, the cold storage system 120 decrypts the ciphertext version of the signed message that is included in the signed message data bundle (e.g., by using a private key of the cold storage system 120). In some variations, the cold storage system 120 provides the decrypted (cleartext) version of the signed message to the cold storage client system 140, as a response to the signing request received at S250. The signed message can then be provided to the requesting system, sent to the respective blockchain, or otherwise used.

In some variations, several signing requests can be received and processed in a batch operation by the secure signing system 110. In some implementations, the cold storage system 120 can generate a data bundle that includes several messages to be signed (either for a same private key, or for different private keys), and provide the data bundle to the secure signing system 110. The secure signing system can decrypt the data bundle, which includes several messages to be signed, α-shards for each message, and optionally an identifier that identifies a public key associated with each message. The α-shards can be combined, the combined α-ciphertext can be decrypted, and the resulting private key can be used to sign the message. In some implementations, the ceremony key used to decrypt α-ciphertext for different private keys is different, and the secure signing module 111 uses a public key identified for the message to select the appropriate ceremony key. In some implementations, a single RuCK HSM can store each ceremony key in association with a public key. In other implementations, one or more RuCK HSMs are used to store the ceremony keys, and RuCK HSMs are associated with the public key that matches the ceremony key stored by the RuCK HSM.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for signing blockchain transactions, the method comprising:
    with online computer system operating within an online computing environment:
        in response to receiving a blockchain transaction to be signed, determining, by the online computer system, a key shard threshold, the key shard threshold being (i) a number of key shards required for reconstructing a signing private key and (ii) less than a number of key shards derived from the signing private key using a ceremony key;
        obtaining, by the online computer system, based on the key shard threshold, signing key shards corresponding to the signing private key from a plurality of account managers, each of the plurality of account managers storing a different one of the signing key shards; and
        storing, by the online computer system, the signing key shards and the blockchain transaction at a removable computer-readable storage medium; and
    with an offline computer system operating within an offline computing environment:
        obtaining, by the offline computer system in the offline computing environment, from the removable computer-readable storage medium, the signing key shards and the blockchain transaction;
        forming, by the offline computer system in the offline computing environment, a ciphertext of the signing private key using the signing key shards that satisfy the key shard threshold;
        reconstructing, by the offline computer system in the offline computing environment, the signing private key by obtaining the ceremony key from a hardware security module (HSM) and decrypting the ciphertext, derived from the signing key shards that satisfy the key shard threshold, using the ceremony key, wherein the ceremony key is a same symmetric private key previously used to encrypt the signing private key to generate a prior ciphertext from which the signing key shards were derived;
        signing, by the offline computer system in the offline computing environment, the blockchain transaction using the signing private key; and
        providing the signed blockchain transaction to the online computer system.

2. The method of claim 1, wherein obtaining the signing key shards comprises asynchronously obtaining the signing key shards from the plurality of account managers by:
    identifying a source address of the blockchain transaction as being associated with a reusable cold key (RuCK) pair that includes the signing private key; and
    accessing, based on the identification of the source address of the blockchain transaction as being associated with the RuCK pair, the signing key shards using RuCK information stored by the online computer system operating within the online computing environment, wherein the RuCK information identifies account managers for each of the signing key shards.

3. The method of claim 2, further comprising, before receiving the blockchain transaction to be signed:
    generating the prior ciphertext from which the signing key shards were derived by encrypting the signing private key of the RuCK pair using the ceremony key;
    splitting the prior ciphertext into a set of key shards that has a greater number of key shards than the key shard threshold, the set of key shards comprising the signing key shards and one or more other key shards;
    encrypting each key shard of the set of key shards to a respective account manager;
    generating at least a portion of the RuCK information;
    providing the generated RuCK information and a public key of the RuCK pair to the online computer system operating within the online computing environment; and
    deleting the signing private key of the RuCK pair, the prior ciphertext, and the signing key shards from the offline computer system (i) after providing the generated RuCK information and the public key of the RuCK pair to the online computer system and (ii) before receiving the blockchain transaction to be signed.

4. The method of claim 1, wherein forming the ciphertext of the signing private key comprises combining the signing key shards to obtain the ciphertext.

5. The method of claim 1, further comprising:
    identifying a passphrase shard threshold, the passphrase shard threshold being a number of passphrase shards required for creating a valid HSM passphrase for accessing the ceremony key via the HSM;
    identifying, based on the passphrase shard threshold, a plurality of HSMs from which to obtain passphrase shards via the offline computer system operating within the offline computing environment;
    generating, via the offline computer system operating within the offline computing environment, an HSM passphrase using the passphrase shards obtained from the identified plurality of HSMs; and
    using the HSM passphrase to unlock the HSM and access the ceremony key.

6. The method of claim 5, wherein the passphrase shard threshold is less than a number of different passphrase shards from which different subsets of passphrases are each usable for creating a valid HSM passphrase for accessing the ceremony key via the HSM.

7. The method of claim 1, wherein providing the signed blockchain transaction to the online computer system comprises:
   storing the signed blockchain transaction at a second removable computer-readable storage medium;
   decoupling the second computer-readable storage medium from the offline computer system operating within the offline computing environment, and
   coupling the second computer-readable storage medium to the online computer system operating within the online computing environment.

8. A system comprising:
   an online computer system operating within an online computing environment; and
   an offline computer system operating within an offline computing environment,
   wherein the online computer system comprises one or more first processors and memory storing instructions that, when executed by the one or more first processors, cause first operations comprising:
      receiving a blockchain transaction to be signed and obtaining, based on a key shard threshold, signing key shards corresponding to a signing private key from a plurality of account managers, each of the plurality of account managers storing a different one of the signing key shards, the key shard threshold being (i) a number of key shards required for reconstructing the signing private key and (ii) less than a number of key shards derived from the signing private key using a ceremony key; and
      storing the signing key shards and the blockchain transaction at a removable computer-readable storage medium, and
   wherein the offline computer system comprises one or more second processors and memory storing instructions that, when executed by the one or more second processors, cause second operations comprising:
      obtaining, from the removable computer-readable storage medium, the signing key shards and the blockchain transaction;
      forming a ciphertext of the signing private key using the signing key shards that satisfy the key shard threshold;
      reconstructing, in the offline computing environment, the signing private key by obtaining the ceremony key from a hardware security module (HSM) and decrypting the ciphertext, derived from the signing key shards that satisfy the key shard threshold, using the ceremony key, wherein the ceremony key is a same symmetric private key previously used to encrypt the signing private key to generate a prior ciphertext from which the signing key shards were derived; and
      signing, in the offline computing environment, the blockchain transaction using the signing private key.

9. The system of claim 8, wherein obtaining the signing key shards comprises asynchronously obtaining the signing key shards from the plurality of account managers by:
   identifying a source address of the blockchain transaction as being associated with a reusable cold key (RuCK) pair that includes the signing private key; and
   accessing, based on the identification of the source address of the blockchain transaction as being associated with the RuCK pair, the signing key shards using RuCK information stored by the online computer system operating within the online computing environment, wherein the RuCK information identifies one or more account managers for each of the signing key shards.

10. The system of claim 9, the second operations of the offline computer system further comprising, before receiving the blockchain transaction to be signed:
    generating the prior ciphertext from which the signing key shards were derived by encrypting the signing private key of the RuCK pair using the ceremony key;
    splitting the prior ciphertext into a set of key shards that has a greater number of key shards than the key shard threshold, the set of key shards comprising the signing key shards and one or more other key shards;
    encrypting each key shard of the set of key shards to a respective account manager;
    generating at least a portion of the RuCK information;
    providing the generated RuCK information and a public key of the RuCK pair to the online computer system operating within the online computing environment; and
    deleting the signing private key of the RuCK pair, the prior ciphertext, and the signing key shards from the offline computer system (i) after providing the generated RuCK information and the public key of the RuCK pair to the online computer system and (ii) before receiving the blockchain transaction to be signed.

11. The system of claim 8, wherein forming the ciphertext of the signing private key comprises combining the signing key shards to obtain the ciphertext.

12. The system of claim 8, the second operations of the offline computer system further comprising:
    identifying a passphrase shard threshold, the passphrase shard threshold being a number of passphrase shards required for creating a valid HSM passphrase for accessing the ceremony key via the HSM;
    identifying, based on the passphrase shard threshold, a plurality of HSMs from which to obtain passphrase shards via the offline computer system operating within the offline computing environment;
    generating, via the offline computer system operating within the offline computing environment, an HSM passphrase using the passphrase shards obtained from the identified plurality of HSMs; and
    using the HSM passphrase to unlock the HSM and access the ceremony key.

13. The system of claim 12, wherein the passphrase shard threshold is less than a number of different passphrase shards from which different subsets of passphrases are each usable for creating a valid HSM passphrase for accessing the ceremony key via the HSM.

14. The system of claim 8, the second operations of the offline computer system further comprising:
    storing the signed blockchain transaction at a second removable computer-readable storage medium.

15. A non-transitory computer-readable media of storing instructions that, when executed by one or more processors, cause operations comprising:
    obtaining, from a removable computer-readable storage medium, via a computer system operating within an offline computing environment, signing key shards corresponding to a signing private key and a blockchain transaction to be signed, wherein the signing key shards satisfy a key shard threshold that is (i) a number of key shards required for reconstructing the signing private key and (ii) less than a number of key shards derived from the signing private key using a ceremony key, wherein the blockchain transaction was received by an online computer system;

forming, via the computer system operating within the offline computing environment, a ciphertext of the signing private key using the signing key shards that satisfy the key shard threshold;

reconstructing, via the computer system operating within the offline computing environment, the signing private key by obtaining the ceremony key from a hardware security module (HSM) and decrypting the ciphertext, derived from the signing key shards that satisfy the key shard threshold, using the ceremony key, wherein the ceremony key is a same symmetric private key previously used to encrypt the signing private key to generate a prior ciphertext from which the signing key shards were derived; and signing, via the computer system operating within the offline computing environment, the blockchain transaction using the signing private key.

16. The media of claim 15, the operations further comprising, before obtaining the blockchain transaction to be signed:

generating the prior ciphertext from which the signing key shards were derived by encrypting the signing private key using the ceremony key;

splitting the prior ciphertext into a set of key shards that has a greater number of key shards than the key shard threshold, the set of key shards comprising the signing key shards and one or more other key shards;

encrypting each key shard of the set of key shards to a respective account manager; and deleting the signing private key, the prior ciphertext, and the signing key shards from the computer system.

17. The media of claim 15, wherein forming the ciphertext of the signing private key comprises combining the signing key shards to obtain the ciphertext.

18. The media of claim 15, the operations further comprising:

identifying a passphrase shard threshold, the passphrase shard threshold being a number of passphrase shards required for creating a valid HSM passphrase for accessing the ceremony key via the HSM;

identifying, based on the passphrase shard threshold, a plurality of HSMs from which to obtain passphrase shards via the computer system operating within the offline computing environment;

generating, via the computer system operating within the offline computing environment, an HSM passphrase using the passphrase shards obtained from the identified plurality of HSMs; and using the HSM passphrase to unlock the HSM and access the ceremony key.

19. The media of claim 18, wherein the passphrase shard threshold is less than a number of different passphrase shards from which different subsets of passphrases are each usable for creating a valid HSM passphrase for accessing the ceremony key via the HSM.

20. The media of claim 15, the operations further comprising:

storing the signed blockchain transaction at a second removable computer-readable storage medium.

* * * * *